US009321900B2

(12) United States Patent
Finlay

(10) Patent No.: US 9,321,900 B2
(45) Date of Patent: Apr. 26, 2016

(54) INHIBITION OF POLYMER SURFACE OXIDATION UTILIZING TWO PRIMARY ANTIOXIDANTS IN CERTAIN POLYMERS

(71) Applicant: EASTMAN CHEMICAL COMPANY, Kingsport, TN (US)

(72) Inventor: Katherine Finlay, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 14/478,790

(22) Filed: Sep. 5, 2014

(65) Prior Publication Data
US 2016/0068658 A1 Mar. 10, 2016

(51) Int. Cl.
*C08K 5/13* (2006.01)
*C08K 5/134* (2006.01)
*C08K 5/1545* (2006.01)
*C08K 5/20* (2006.01)
*C08K 5/09* (2006.01)
*C08K 5/098* (2006.01)
*C08K 5/01* (2006.01)

(52) U.S. Cl.
CPC ... *C08K 5/13* (2013.01); *C08K 5/01* (2013.01); *C08K 5/09* (2013.01); *C08K 5/098* (2013.01); *C08K 5/134* (2013.01); *C08K 5/1545* (2013.01); *C08K 5/20* (2013.01)

(58) Field of Classification Search
CPC ........ C08K 5/134; C08K 5/13; C08K 5/1545; C08K 5/20; C08K 5/09; C08K 5/098; C08K 5/01; C08G 63/00
See application file for complete search history.

(56) References Cited

U.S. PATENT DOCUMENTS 5,989,663 A * 11/1999 Morris et al. ................. 428/35.7
2007/0213436 A1 * 9/2007 Maas et al. .................... 524/133

FOREIGN PATENT DOCUMENTS

CN     101845213     * 9/2010 .............. C08L 69/00

OTHER PUBLICATIONS

Machine translation of CN 101845213. Sep. 2010.*
New copending U.S. Appl. No. 14/478,638, filed Sep. 5, 2014, Katherine Finlay.
Vulic, Ivan; Vitarelli, Giacomo; Zenner, John M. Polymer Degradation and Stability, 78, 27-34 (2002).
Thomas, Richard; Dexter, Martin; King R. E. "Antioxidants, Polymers" Kirk-Othmer Encyclopedia of Chemical Technology. 5th edition, 2002. Online access.
Varatharajan, K.; Cheralathan, M.; Velraj, R. Fuel 90, 2721-2725 (2011).
Mathur, G.; Kresta, J. E.; Frisch, K. C. Advances in Urethane Science and Technology 6, 103-172 (1978).
Vélez-Garcia, G. M.; Wapperom, P.; Kunc, V.; Baird, D. G.; Zink-Sharp, A. Journal of Microscopy, 248 (1), 23-33 (2012).

* cited by examiner

*Primary Examiner* — John Uselding
(74) *Attorney, Agent, or Firm* — Robert C. Morriss

(57) ABSTRACT

This invention relates to a polymer composition comprising:
(A) a copolyester comprising residues of terephthalic acid, 1,4-cyclohexanedimethanol, and 2,2,4,4-tetramethylcyclobutanediol, and
(B) a stabilizing composition comprising:
(1) a phenolic antioxidant without a long-chain substituent; and
(2) a phenolic antioxidant with a long-chain substituent,
wherein the phenolic antioxidant (1) has 10 to 20 carbon atoms,
wherein the phenolic antioxidant (2) has greater than 20 carbon atoms, and
wherein the weight ratio of phenolic antioxidant (1) to phenolic antioxidant (2) is from 0.7:1 to 1.3:1.

23 Claims, No Drawings

INHIBITION OF POLYMER SURFACE OXIDATION UTILIZING TWO PRIMARY ANTIOXIDANTS IN CERTAIN POLYMERS

FIELD OF THE INVENTION

This invention relates to a combination of two phenolic antioxidants used in combination to impede oxidative degradation at the surface of certain polymeric materials.

BACKGROUND OF THE INVENTION

Polyesters and other polymeric materials are subject to oxidative polymer degradation during processing and usage due to exposures such as ultraviolet light. More specifically, surface oxidative degradation may occur in exposures to environments containing free radicals. Oxidative degradation is typically hindered by incorporating antioxidants into the material to prevent degradation of the bulk material.

There are two main types of antioxidants, referred to as primary and secondary, and defined by their mode of operation. Primary antioxidants are free radical scavengers that generally terminate free radical chain propagation by donating a hydrogen atom and include hindered phenols and secondary aromatic amines. Secondary antioxidants are hydroperoxide radical decomposers that operate by decomposing the radical into stable non-reactive products and are typically divalent sulfur or trivalent phosphorous.

Antioxidants have also been used to hinder oxidation at the surface of a polymeric material. It has been noted in the art that combining a radical scavenger antioxidant with a peroxide decomposer antioxidant can result in synergistic effects because of complementary but different reaction mechanisms.

SUMMARY OF THE INVENTION

This invention is believed to show synergistic effects in impeding oxidative degradation at the surface of certain polymeric materials. In addition, this invention is believed to outperform combinations comprised of the more typical radical scavenger and peroxide decomposer antioxidants, as well as other combinations of different primary antioxidants with similar chemistries.

This invention relates to a stabilizing composition for thermoplastic polymers, comprising:
(1) a phenolic antioxidant without a long-chain substituent; and
(2) a phenolic antioxidant with a long-chain substituent,
wherein phenolic antioxidant (1) has 10 to 20 carbon atoms,
wherein the phenolic antioxidant (2) has greater than 20 carbon atoms, and
wherein the weight ratio of phenolic antioxidant (1) to phenolic antioxidant (2) is from 0.7:1 to 1.3:1 or from 0.8:1 to 1.2:1 or from 0.9:1 to 1.1:1 or from 0.95:1 to 1.05:1.

In one embodiment, this invention relates to a polymer composition comprising:
(A) a polyester, and
(B) a stabilizing composition comprising:
(1) a phenolic antioxidant without a long-chain substituent; and
(2) a phenolic antioxidant with a long-chain substituent,
wherein the phenolic antioxidant (1) has 10 to 20 carbon atoms,
wherein the phenolic antioxidant (2) has greater than 20 carbon atoms, and
wherein the weight ratio of phenolic antioxidant (1) to phenolic antioxidant (2) is from 0.7:1 to 1.3:1.

In one embodiment, this invention relates to a polymer composition comprising:
(A) a copolyester comprising residues of terephthalic acid, 1,4-cyclohexanedimethanol, and 2,2,4,4-tetramethylcyclobutanediol (hereinafter referred to as TMCD copolyester), and
(B) a stabilizing composition comprising:
(1) a phenolic antioxidant without a long-chain substituent; and
(2) a phenolic antioxidant with a long-chain substituent,
wherein the phenolic antioxidant (1) has 10 to 20 carbon atoms,
wherein the phenolic antioxidant (2) has greater than 20 carbon atoms, and
wherein the weight ratio of phenolic antioxidant (1) to phenolic antioxidant (2) is from 0.7:1 to 1.3:1.

In one embodiment, this invention relates to a polymer composition comprising:
(A) a copolyester comprising 15 to 40 mole % 2,2,4,4-tetramethyl-1,3-cyclobutanediol residues and 60 to 85 mole 1,4-cyclohexanedimethanol residues and 70 to 100 mole terephthalic acid residues, based on a total of 100 mole % acid residues and a total of 100 mole % diol residues, and
(B) a stabilizing composition comprising:
(1) a phenolic antioxidant without a long-chain substituent; and
(2) a phenolic antioxidant with a long-chain substituent,
wherein the phenolic antioxidant (1) has 10 to 20 carbon atoms,
wherein the phenolic antioxidant (2) has greater than 20 carbon atoms, and
wherein the weight ratio of phenolic antioxidant (1) to phenolic antioxidant (2) is from 0.7:1 to 1.3:1.

In one embodiment, this invention relates to a polymer composition comprising:
(A) a copolyester comprising 20 to 40 mole % 2,2,4,4-tetramethyl-1,3-cyclobutanediol residues and 60 to 80 mole 1,4-cyclohexanedimethanol residues and 70 to 100 mole terephthalic acid residues, based on a total of 100 mole % acid residues and a total of 100 mole % diol residues, and
(B) a stabilizing composition comprising:
(1) a phenolic antioxidant without a long-chain substituent; and
(2) a phenolic antioxidant with a long-chain substituent,
wherein the phenolic antioxidant (1) has 10 to 20 carbon atoms,
wherein the phenolic antioxidant (2) has greater than 20 carbon atoms, and
wherein the weight ratio of phenolic antioxidant (1) to phenolic antioxidant (2) is from 0.7:1 to 1.3:1.

In one embodiment, this invention relates to a polymer composition comprising:
(A) a copolyester comprising 20 to 30 mole % 2,2,4,4-tetramethyl-1,3-cyclobutanediol residues and 70 to 80 mole 1,4-cyclohexanedimethanol residues and 70 to 100 mole terephthalic acid residues, based on a total of 100 mole % acid residues and a total of 100 mole % diol residues, and
(B) a stabilizing composition comprising:
(1) a phenolic antioxidant without a long-chain substituent; and
(2) a phenolic antioxidant with a long-chain substituent, wherein the phenolic antioxidant (1) has 10 to 20 carbon atoms, wherein the phenolic antioxidant (2) has greater than 20 carbon atoms, and wherein the weight ratio of phenolic antioxidant (1) to phenolic antioxidant (2) is from 0.7:1 to 1.3:1.

In one embodiment, this invention relates to a polymer composition comprising:
(a) a copolyester comprising 30 to 40 mole % 2,2,4,4-tetramethyl-1,3-cyclobutanediol residues and 60 to 70 mole 1,4-cyclohexanedimethanol residues and 70 to 100 mole terephthalic acid residues, based on a total of 100 mole % acid residues and a total of 100 mole % diol residues, and
(B) a stabilizing composition comprising:
(1) a phenolic antioxidant without a long-chain substituent; and
(2) a phenolic antioxidant with a long-chain substituent,
wherein the phenolic antioxidant (1) has 10 to 20 carbon atoms,
wherein the phenolic antioxidant (2) has greater than 20 carbon atoms, and
wherein the weight ratio of phenolic antioxidant (1) to phenolic antioxidant (2) is from 0.7:1 to 1.3:1.

In one embodiment, this invention relates to a polymer composition comprising:
(A) an acrylic polymer, and
(B) a stabilizing composition comprising:
(1) a phenolic antioxidant without a long-chain substituent; and
(2) a phenolic antioxidant with a long-chain substituent,
wherein the phenolic antioxidant (1) has 10 to 20 carbon atoms,
wherein the phenolic antioxidant (2) has greater than 20 carbon atoms, and
wherein the weight ratio of phenolic antioxidant (1) to phenolic antioxidant (2) is from 0.7:1 to 1.3:1.

For the purposes of this invention, "long chain substituent" means that the substituent itself has at least one of the following number of carbon atoms: 8 or more, or 10 or more, or 8 to 25, or 8 to 20, or 8 to 18, or 10 to 25, or 10 to 20, or 10 to 18.

In one embodiment of the invention, at least one phenolic antioxidant (1) is butylated hydroxytoluene (BHT) or butylated hydroxyanisole (BHA) or tert-butylhydroquinone (TBHQ). In one embodiment, phenolic antioxidant (1) is butylated hydroxytoluene (BHT). In one embodiment, tert-butylhydroquinone (TBHQ) is excluded from the scope of the invention. In one embodiment, phenolic antioxidants that contain more than one hydroxyl substituent are excluded from the scope of the invention. In one embodiment, phenolic antioxidant (1) can contain 11 to 20 carbon atoms. In any of the embodiments of the invention, phenolic antioxidant (1) can be sterically hindered.

In one embodiment, phenolic antioxidant (2) can have over 20 carbon atoms. In one embodiment, phenolic antioxidant (2) can have 20 to 70 carbon atoms or 20 to 65 carbon atoms or 20 to 60 carbon atoms or 20 to 55 carbon atoms or 20 to 50 carbon atoms or 20 to 45 carbon atoms or 20 to 40 carbon atoms or 20 to 35 carbon atoms or 20 to 30 carbon atoms. In any of the embodiments of the invention, phenolic antioxidant (2) can be sterically hindered.

In another embodiment, at least one phenolic antioxidant (2) is octadecyl-3-(3,5-di-tert-butyl-4-hydroxyphenyl)-propionate (otherwise known as octadecyl-3,5-di-(tert)-butyl-4-hydroxyhydrocinnamate) (AO1076). In yet another embodiment, phenolic antioxidant (2) is α-tocopherol (Vitamin E).

In one embodiment, the combination of BHT and Vitamin E is used.

In one embodiment, the combination of BHT and AO1076 is used.

In one embodiment, the combination of BHA and Vitamin E is used.

In one embodiment, the combination of BHA and AO1076 is used.

In one embodiment, the polymer compositions of the invention comprising: (a) at least one thermoplastic polymer, for example, a TMCD copolyester, (b) at least one mold release agent, and (c) the stabilizing composition useful in the invention.

In one embodiment, the polymers useful in the compositions of the invention are selected from the group consisting of certain polyesters, certain copolyesters, acrylic polymers, for example, styrene-methyl methacrylate (NAS) copolymers, styrene acrylonitrile (SAN), poly(ethylmethacrylate) (PEMA), and poly(methylmethacrylate) (PMMA).

In one embodiment, a copolyester that may be useful in the polymer composition of the invention comprises residues of terephthalic acid, ethylene glycol, and 1,4-cyclohexanedimethanol (PETG copolyesters).

In one embodiment, the copolyester useful in the polymer compositions of the invention comprises residues of terephthalic acid, 1,4-cyclohexanedimethanol and 2,2,4,4-tetramethyl-cyclobutanediol (TMCD copolyesters).

In one embodiment, polymers useful in the compositions of the invention are selected from the group consisting of TMCD copolyesters, styrene-methyl methacrylate copolymers, and poly(methylmethacrylate).

In one embodiment, the stabilizing composition useful in the invention is useful in polymer compositions that contain TMCD copolyesters.

In one embodiment, the polymers useful in the compositions of the invention are selected from the group consisting of acrylic polymers such as styrene-methyl methacrylate copolymer [(for example, styrene-methyl methacrylate copolymer) (70:30)], and poly(methylmethacrylate).

In one embodiment, the invention comprises a polymer composition comprising: (a) at least one copolyester, for example, at least one TMCD polyester, (b) at least one mold release agent, and (c) the stabilizing composition useful in the invention.

In one embodiment, the invention comprises a polymer composition comprising: (a) at least one copolyester, for example, at least one TMCD polyester, (b) at least one mold release agent, wherein the mold release agent is not zinc stearate, and (c) the stabilizing composition useful in the invention.

In one embodiment, the mold release agent can be selected from erucylamide, stearamide, calcium stearate, stearic acid, montanic acid, montanic acid esters, montanic acid salts, oleic acid, palmitic acid, paraffin wax, polyethylene waxes, polypropylene waxes, carnauba wax, glycerol monostearate, or glycerol distearate or combinations thereof.

In one embodiment, at least one mold release agent can be selected from stearic acid and/or palmitic acid.

In one embodiment, the mold release agent is not zinc stearate.

The total amount of phenolic antioxidant(s) useful in the invention (total loading) can be present in the amount of: 0.01 to 1.5 weight percent or 0.01 to 1.0 weight percent or 0.01 to 0.50 weight percent or 0.05 to 0.30 weight percent or 0.05 to 0.20 weight percent or 0.05 to 0.15 weight percent or 0.30 to 0.70 weight percent or 0.30 to 0.60 weight percent or 0.30 to 0.50 weight percent or 0.35 to 0.50 weight percent or 0.40 to 0.50 weight percent, based on the total weight percentage of the polymer composition, and as measured by HPLC analysis of the final polymer composition.

In one embodiment, the total amount of phenolic antioxidant(s) in the TMCD polyesters useful in the invention (total loading) can be present in the amount of: 0.30 to 0.50 weight percent or 0.35 to 0.50 weight percent, based on the total weight percentage of the polymer composition, and as measured by HPLC analysis of the final polymer composition.

In one embodiment, the total amount of phenolic antioxidant(s) in the PMMA polymers useful in the invention (total loading) can be present in the amount of: 0.30 to 0.50 weight percent or 0.35 to 0.45 weight percent, based on the total weight percentage of the polymer composition, and as measured by HPLC analysis of the final polymer composition.

In one embodiment, the total amount of phenolic antioxidant(s) for the NAS polymers useful in the invention (total loading) can be present in the amount of: 0.01 to 0.5 weight percent or 0.05 to 0.30 weight percent or 0.05 to 0.20 weight percent or 0.05 to 0.15 weight percent, based on the total weight percentage of the polymer composition, and as measured by HPLC analysis of the final polymer composition.

In one embodiment, the polymer compositions containing the stabilizing compositions of the invention, for example, the TMCD copolyester compositions, can have a transmission percentage of at least 75% or at least 70% or at least 65% or at least 60% as determined by the method described in the Examples herein and under the conditions described in Table 4.

In one embodiment, the polymer compositions containing the stabilizing compositions of the invention for example, the TMCD copolyester compositions, can have a transmission percentage of at least 75% or at least 70% or at least 65% or at least 60% as determined by the method described herein when using canola oil or soybean oil as determined by the method described in the Examples herein and under the conditions described in Table 4.

In one embodiment, the polymer compositions containing the stabilizing compositions of the invention, for example, the TMCD copolyester compositions, can have a transmission percentage of at least 75% or at least 70% or at least 65% or at least 60% as determined by the method described herein when using canola oil or soybean oil as determined by the method described in the Examples herein and under the conditions described in Table 4 when using Detergent 1.

In one embodiment, the polymer compositions containing the stabilizing compositions of the invention, for example, the acrylic polymer compositions, can have a transmission percentage of at least 75% or at least 70% or at least 65% or at least 60% or at least 55% or at least 50% or at least 45% or at least 40% as determined by the method described in the Examples and under the conditions described in Table 5 and Table 12 herein.

In one embodiment, the polymer compositions containing the stabilizing compositions of the invention, for example, the acrylic polymer compositions, can have a transmission percentage of at least 75% or at least 70% or at least 65% or at least 60% or at least 55% or at least 50% or at least 45% or at least 40% as determined by the method described in the Examples and under the conditions described in Table 5 and Table 12 when using canola oil.

In one embodiment, the polymer compositions containing the stabilizing compositions of the invention, for example, the acrylic polymer compositions, can have a transmission percentage of at least 75% or at least 70% or at least 65% or at least 60% or at least 55% or at least 50% or at least 45% or at least 40% as determined by the method described in the Examples and under the conditions described in Table 5 and Table 12 herein when using canola oil and when using Detergent 1.

In one embodiment, the polymer compositions containing the stabilizing compositions of the invention, for example, the NAS polymer compositions useful in the invention, can have a transmission percentage of at least 75% or at least 70% or at least 65% or at least 60% as determined by the method described in the Examples and under the conditions described in Table 5 and Table 12 herein.

In one embodiment, the polymer compositions containing the stabilizing compositions of the invention, for example, the NAS polymer compositions, can have a transmission percentage of at least 75% or at least 70% or at least 65% or at least 60% as determined by the method described in the Examples and under the conditions described in Table 5 and Table 12 herein when using canola oil.

In one embodiment, the polymer compositions containing the stabilizing compositions of the invention, for example, the NAS polymer compositions, can have a transmission percentage of at least 75% or at least 70% or at least 65% or at least 60% as determined by the method described in the Examples and under the conditions described in Table 5 and Table 12 herein when using canola oil and when using Detergent 1.

In one embodiment, the polymer compositions containing the stabilizing compositions of the invention, for example, the PMMA polymer compositions, can have a transmission percentage of at least 50% or at least 45% or at least 40% as determined by the method described in the Examples and under the conditions described in Table 5 and Table 12 herein.

In one embodiment, the polymer compositions containing the stabilizing compositions of the invention, for example, the PMMA polymer compositions, can have a transmission percentage of at least 50% or at least 45% or at least 40% as determined by the method described in the Examples and under the conditions described in Table 5 and Table 12 herein when using canola oil.

In one embodiment, the polymer compositions containing the stabilizing compositions of the invention, for example, the PMMA polymer compositions, can have a transmission percentage of at least 50% or at least 45% or at least 40% as determined by the method described in the Examples and under the conditions described in Table 5 and Table 12 herein when using canola oil and when using Detergent 1.

In one embodiment, the invention relates to a method for stabilizing any of the thermoplastic polymers useful in the invention against surface oxidative degradation, comprising:

incorporating into the polymer an effective stabilizing amount of the stabilizing composition of the invention.

DETAIL DESCRIPTION OF THE INVENTION

The present invention may be understood more readily by reference to the following detailed description of certain embodiments of the invention and the working examples. In accordance with the purpose(s) of this invention, certain embodiments of the invention are described in the Summary of the Invention and are further described herein below. Also, other embodiments of the invention are described herein.

The combination of antioxidants useful in this invention outperformed combinations comprised of the more typical radical scavenger and peroxide decomposer antioxidants, as well as other combinations of different primary antioxidants with similar chemistries.

In one embodiment, this invention relates to a polymer composition comprising:
(A) a polyester, and
(B) a stabilizing composition comprising:
(1) a phenolic antioxidant without a long-chain substituent; and
(2) a phenolic antioxidant with a long-chain substituent,
wherein the phenolic antioxidant (1) has 10 to 20 carbon atoms,
wherein the phenolic antioxidant (2) has greater than 20 carbon atoms, and
wherein the weight ratio of phenolic antioxidant (1) to phenolic antioxidant (2) is from 0.7:1 to 1.3:1.

In one embodiment, this invention relates to a polymer composition comprising:
(A) a copolyester comprising residues of terephthalic acid, 1,4-cyclohexanedimethanol, and 2,2,4,4-tetramethyl-cyclobutanediol, and
(B) a stabilizing composition comprising:
(1) a phenolic antioxidant without a long-chain substituent; and
(2) a phenolic antioxidant with a long-chain substituent,
wherein the phenolic antioxidant (1) has 10 to 20 carbon atoms,
wherein the phenolic antioxidant (2) has greater than 20 carbon atoms, and
wherein the weight ratio of phenolic antioxidant (1) to phenolic antioxidant (2) is from 0.7:1 to 1.3:1.

In one embodiment, this invention relates to a polymer composition comprising:
(A) a copolyester comprising 15 to 40 mole % 2,2,4,4-tetramethyl-1,3-cyclobutanediol residues and 60 to 85 mole 1,4-cyclohexanedimethanol residues and 70 to 100 mole terephthalic acid residues, based on a total of 100 mole % acid residues and a total of 100 mole % diol residues, and
(B) a stabilizing composition comprising:
(1) a phenolic antioxidant without a long-chain substituent; and
(2) a phenolic antioxidant with a long-chain substituent,
wherein the phenolic antioxidant (1) has 10 to 20 carbon atoms,
wherein the phenolic antioxidant (2) has greater than 20 carbon atoms, and
wherein the weight ratio of phenolic antioxidant (1) to phenolic antioxidant (2) is from 0.7:1 to 1.3:1.

In one embodiment, this invention relates to a polymer composition comprising:
(A) a copolyester comprising 20 to 40 mole % 2,2,4,4-tetramethyl-1,3-cyclobutanediol residues and 60 to 80 mole 1,4-cyclohexanedimethanol residues and 70 to 100 mole terephthalic acid residues, based on a total of 100 mole % acid residues and a total of 100 mole % diol residues, and
(B) a stabilizing composition comprising:
(1) a phenolic antioxidant without a long-chain substituent; and
(2) a phenolic antioxidant with a long-chain substituent,
wherein the phenolic antioxidant (1) has 10 to 20 carbon atoms,
wherein the phenolic antioxidant (2) has greater than 20 carbon atoms, and
wherein the weight ratio of phenolic antioxidant (1) to phenolic antioxidant (2) is from 0.7:1 to 1.3:1.

In one embodiment, this invention relates to a polymer composition comprising:
(A) a copolyester comprising 20 to 30 mole % 2,2,4,4-tetramethyl-1,3-cyclobutanediol residues and 70 to 80 mole 1,4-cyclohexanedimethanol residues and 70 to 100 mole terephthalic acid residues, based on a total of 100 mole % acid residues and a total of 100 mole % diol residues, and
(B) a stabilizing composition comprising:
(1) a phenolic antioxidant without a long-chain substituent; and
(2) a phenolic antioxidant with a long-chain substituent,
wherein the phenolic antioxidant (1) has 10 to 20 carbon atoms,
wherein the phenolic antioxidant (2) has greater than 20 carbon atoms, and
wherein the weight ratio of phenolic antioxidant (1) to phenolic antioxidant (2) is from 0.7:1 to 1.3:1.

In one embodiment, this invention relates to a polymer composition comprising:
(A) a copolyester comprising 30 to 40 mole % 2,2,4,4-tetramethyl-1,3-cyclobutanediol residues and 60 to 70 mole 1,4-cyclohexanedimethanol residues and 70 to 100 mole terephthalic acid residues, based on a total of 100 mole % acid residues and a total of 100 mole % diol residues, and
(B) a stabilizing composition comprising:
(1) a phenolic antioxidant without a long-chain substituent; and
(2) a phenolic antioxidant with a long-chain substituent,
wherein the phenolic antioxidant (1) has 10 to 20 carbon atoms,
wherein the phenolic antioxidant (2) has greater than 20 carbon atoms, and
wherein the weight ratio of phenolic antioxidant (1) to phenolic antioxidant (2) is from 0.7:1 to 1.3:1.

In one embodiment, this invention relates to a polymer composition comprising:
(A) an acrylic polymer, and
(B) a stabilizing composition comprising:
(1) a phenolic antioxidant without a long-chain substituent; and
(2) a phenolic antioxidant with a long-chain substituent,
wherein the phenolic antioxidant (1) has 10 to 20 carbon atoms,
wherein the phenolic antioxidant (2) has greater than 20 carbon atoms, and
wherein the weight ratio of phenolic antioxidant (1) to phenolic antioxidant (2) is from 0.7:1 to 1.3:1.

In one embodiment of the invention, the weight ratio of phenolic antioxidant (1) to phenolic antioxidant (2) can be any of 0.8:1 to 1.2:1 or from 0.9:1 to 1.1:1 or from 0.95:1 to 1.05:1.

In one embodiment of the invention, at least one phenolic antioxidant (1) can be butylated hydroxytoluene (BHT) or butylated hydroxyanisole (BHA) or tert-butylhydroquinone (TBHQ) or mixtures of at least two or more thereof. In one embodiment, at least one phenolic antioxidant (1) can be butylated hydroxytoluene (BHT) or butylated hydroxyanisole (BHA). In one embodiment, at least one phenolic antioxidant (1) can be butylated hydroxytoluene (BHT). In one embodiment, at least one phenolic antioxidant (1) can be butylated hydroxyanisole (BHA).

In one embodiment, at least one phenolic antioxidant (1) can be tert-butylhydroquinone (TBHQ). In one embodiment, TBHQ is excluded from the scope of this invention. In one embodiment, phenolic antioxidants that contain more than one hydroxyl group are excluded from the scope of the invention. In one embodiment, phenolic antioxidant (1) can have from 11 to 20 carbon atoms. In any of the embodiments of the invention, phenolic antioxidant (1) can be sterically hindered.

In one embodiment, phenolic antioxidant (2) can have over 20 carbon atoms. In one embodiment, phenolic antioxidant (2) can have 20 to 70 carbon atoms or 20 to 65 carbon atoms or 20 to 60 carbon atoms or 20 to 55 carbon atoms or 20 to 50 carbon atoms or 20 to 45 carbon atoms or 20 to 40 carbon atoms or 20 to 35 carbon atoms or 20 to 30 carbon atoms. In any of the embodiments of the invention, phenolic antioxidant (2) can be sterically hindered.

In one embodiment, at least one phenolic antioxidant (2) can be octadecyl-3-(3,5-di-tert-butyl-4-hydroxyphenyl)-propionate (AO1076). In a further embodiment, at least one phenolic antioxidant (2) can be Vitamin E.

In one embodiment, the following combination of phenolic antioxidants can be useful in the invention: (1) butylated hydroxytoluene (BHT) and octadecyl-3-(3,5-di-tert-butyl-4-hydroxyphenyl)-propionate); (2) butylated hydroxyanisole (BHA) and octadecyl-3-(3,5-di-tert-butyl-4-hydroxyphenyl)-propionate)(AO 1076); (3) butylated hydroxyanisole (BHA) and Vitamin E; butylated hydroxytoluene (BHT) and Vitamin E.

In one embodiment, the stabilizing composition of the invention is butylated hydroxytoluene (BHT) and octadecyl-3-(3,5-di-tert-butyl-4-hydroxyphenyl)-propionate) (AO 1076).

The total amount of phenolic antioxidant(s) useful in the invention (total loading) can be present in the amount of: 0.01 to 5 weight percent or from 0.01 to 1.5 weight percent or 0.01 to 1.0 weight percent or 0.01 to 0.50 weight percent or 0.05 to 0.30 weight percent or 0.05 to 0.20 weight percent or 0.05 to 0.15 weight percent or 0.30 to 0.70 weight percent or 0.30 to 0.60 weight percent or 0.30 to 0.50 weight percent or 0.35 to 0.50 weight percent or 0.40 to 0.50 weight percent, based on the total weight percentage of the polymer composition and as measured by HPLC analysis of the final polymer composition.

In one embodiment, the total amount of phenolic antioxidant(s) in the TMCD polyesters useful in the invention (total loading) can be present in the amount of: 0.30 to 0.50 weight percent or 0.35 to 0.50 weight percent, based on the total weight percentage of the polymer composition, and as measured by HPLC analysis of the final polymer composition.

In one embodiment, the total amount of phenolic antioxidant(s) in the PMMA polymers useful in the invention (total loading) can be present in the amount of: 0.30 to 0.50 weight percent or 0.35 to 0.45 weight percent, based on the total weight percentage of the polymer composition and as measured by HPLC analysis of the final polymer composition.

In one embodiment, the total amount of phenolic antioxidant(s) for the NAS polymers useful in the invention (total loading) can be present in the amount of: 0.01 to 0.5 weight percent or 0.05 to 0.30 weight percent or 0.05 to 0.20 weight percent or 0.05 to 0.15 weight percent, based on the total weight percentage of the polymer composition and as measured by HPLC analysis of the final polymer composition.

In one embodiment, the polymer composition can comprise a stabilizing composition comprising phenolic antioxidants (1) and (2) wherein the weight ratio of phenolic antioxidant (1) to phenolic antioxidant (2) is from 0.7:1 to 1.3:1 or from 0.8:1 to 1.2:1 or from 0.9:1 to 1.1:1 or from 0.95:1 to 1.05:1, and wherein the stabilizing composition is present at 0.01 to 5 weight percent or from 0.01 to 1.5 weight percent or 0.01 to 1.0 weight percent or 0.01 to 0.50 weight percent or 0.05 to 0.30 weight percent or 0.05 to 0.20 weight percent or 0.05 to 0.15 weight percent or 0.30 to 0.70 weight percent or 0.30 to 0.60 weight percent or 0.30 to 0.50 weight percent or 0.35 to 0.50 weight percent or 0.40 to 0.50 weight percent, based on the total weight percentage of the polymer composition and as measured by HPLC analysis of the final polymer composition.

In addition, it was noted that a loading level window including a minimum and maximum loading level, provided better performance than simply increasing the antioxidant levels.

Any of the above combinations of phenolic antioxidants may be used in conjunction with any of the weight percentages described herein for the stabilizing composition.

In one embodiment, the invention comprises a polymer composition comprising: (a) at least one thermoplastic polymer, for example, TMCD polyester, (b) at least one mold release agent, and (c) the stabilizing composition useful in the invention.

In one embodiment, the polymer useful in the polymer compositions of the invention is selected from the group consisting of polyesters, copolyesters, styrene-methyl methacrylate copolymers, and poly(methylmethacrylate). In one embodiment, any of PETG, PCTG and PET polyesters can be excluded from the scope of the invention. In one embodiment, isosorbide polyesters can be excluded from the scope of the invention.

In one embodiment, the invention comprises a polymer composition comprising: (a) at least one copolyester, for example, TMCD copolyester, (b) at least one mold release agent and (c) the stabilizing composition useful in the invention.

In one embodiment, the invention comprises a polymer composition comprising: (a) at least one copolyester, for example, TMCD copolyester, (b) at least one mold release agent wherein the mold release agent is not zinc stearate, and (c) the stabilizing composition useful in the invention.

In one embodiment, the copolyester useful in the polymer composition of the invention comprises residues of terephthalic acid, 1,4-cyclohexanedimethanol and 2,2,4,4-tetramethyl-cyclobutanediol (TMCD copolyesters).

In one embodiment, the mold release agent can be selected from erucylamide, stearamide, calcium stearate, stearic acid, montanic acid, montanic acid esters, montanic acid salts, oleic acid, palmitic acid, paraffin wax, polyethylene waxes, polypropylene waxes, carnauba wax, glycerol monostearate or glycerol distearate or combinations thereof.

In one embodiment, at least one mold release agent can be selected from stearic acid and palmitic acid or a combination thereof.

In one embodiment, the invention relates to a method for stabilizing any of the thermoplastic polymers useful in the invention against surface oxidative degradation, comprising:
  incorporating into the polymer an effective stabilizing amount of a stabilizing composition.

The term "polyester", as used herein, is intended to include "copolyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds. Typically the difunctional carboxylic acid can be a dicarboxylic acid and the difunctional hydroxyl compound can be a dihydric alcohol such as, for example, glycols and diols. The term "glycol" as used in this application includes, but is not limited to, diols, glycols, and/or multifunctional hydroxyl compounds, for example, branching agents. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The term "residue," as used herein, means any organic structure incorporated into a polymer through a polycondensation and/or an esterification reaction from the corresponding monomer. The term "repeating unit", as used herein, means an organic structure having a dicarboxylic acid residue and a diol residue bonded through a carbonyloxy group. Thus, for example, the dicarboxylic acid residues may be derived from a dicarboxylic acid monomer or its associated acid halides, esters, salts, anhydrides, or mixtures thereof. As used herein, therefore, the term "dicarboxylic acid" is intended to include dicarboxylic acids and any derivative of a dicarboxylic acid, including its associated acid halides, esters, half-esters, salts, half-salts, anhydrides, mixed anhydrides, or mixtures thereof, useful in a reaction process with a diol to make polyester. Furthermore, as used in this application, the term "diacid" includes multifunctional acids, for example, branching agents. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, or mixtures thereof, or residues thereof useful in a reaction process with a diol to make polyester.

In one embodiment, dimethyl terephthalate is used as the starting material.

The polyesters used in the present invention typically can be prepared from dicarboxylic acids and diols which react in substantially equal proportions and are incorporated into the polyester polymer as their corresponding residues. The polyesters of the present invention, therefore, can contain substantially equal molar proportions of acid residues (100 mole %) and diol (and/or multifunctional hydroxyl compounds) residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a polyester containing 30 mole % isophthalic acid, based on the total acid residues, means the polyester contains 30 mole % isophthalic acid residues out of a total of 100 mole % acid residues. Thus, there are 30 moles of isophthalic acid residues among every 100 moles of acid residues. In another example, a polyester containing 30 mole % 2,2,4,4-tetramethyl-1,3-cyclobutanediol, based on the total diol residues, means the polyester contains 30 mole % 2,2,4,4-tetramethyl-1,3-cyclobutanediol residues out of a total of 100 mole % diol residues. Thus, there are 30 moles of 2,2,4,4-tetramethyl-1,3-cyclobutanediol residues among every 100 moles of diol residues.

In other aspects of the invention, the Tg of the polyesters useful in the invention can be at least one of the following ranges: 80 to 130° C.; 80 to 125° C.; 80 to 120° C.; 80 to 115° C.; 80 to 110° C.; 80 to 105° C.; 80 to 100° C.; 80 to 95° C.; 85 to 130° C.; 85 to 125° C.; 85 to 120° C.; 85 to 115° C.; 85 to 110° C.; 85 to 105° C.; 85 to 100° C.; 85 to 95° C.; 90 to 130° C.; 90 to 125° C.; 90 to 120° C.; 90 to 115° C.; 90 to 110° C.; 90 to 105° C.; 90 to 100° C.; 95 to 130° C.; 95 to 125° C.; 95 to 120° C.; 95 to 115° C.; 95 to 110° C.; 95 to 105° C.; 100 to 130° C.; 100 to 125° C.; 100 to 120° C.; 100 to 115° C.; 100 to 110° C.; 105 to 130° C.; 105 to 125° C.; 105 to 120° C.; 105 to 115° C.; 110 to 130° C.; 110 to 125° C.; 110 to 120° C.; 115 to 130° C.; 115 to 125° C.; 115 to 120° C.; 115 to 130° C.; 115 to 125° C.; 115 to 120° C.; and 120 to 130° C.

In some aspects of the invention, the copolyesters useful in the invention may comprise a diacid component comprising at least 70 mole percent of the residues of terephthalic acid, isophthalic acid, or mixtures thereof; and a diol component comprising (a) the residues of 2,2,4,4-tetramethyl-1,3-cyclobutanediol and residues of 1,4-cyclohexanedimethanol (TMCD Copolyesters).

In some embodiments, the invention may be useful in copolyesters comprising (a) 25 to 50 mole percent of the residues of 1,4-cyclohexanedimethanol and from 50 to 75 mole percent of the residues of ethylene glycol (PETG) and at least 70 mole percent of the residues of terephthalic acid, isophthalic acid, or mixtures thereof; or (b) greater than 50 to 99 mole percent of the residues of 1,4-cyclohexanedimethanol and from 1 to less than 50 mole percent of the residues of ethylene glycol (PCTG) and at least 70 mole percent of the residues of terephthalic acid, isophthalic acid, or mixtures thereof; or (c) up to 25 mole percent of the residues of 1,4-cyclohexanedimethanol and greater than 75 mole percent of the residues of ethylene glycol (PET), and at least 70 mole percent of the residues of terephthalic acid, isophthalic acid, or mixtures thereof; or (d) isosorbide polymers comprising 1,4-cyclohexanedimethanol and optionally, ethylene glycol or (e) isosorbide polymers comprising ethylene glycol.) In one embodiment of the invention, PETG, PCTG, PET polyesters, and isosorbide polyesters as defined herein are excluded from the scope of the invention.

In other aspects of the invention, the glycol component for the TMCD copolyesters useful in the invention include, but are not limited to, at least one of the following combinations of ranges: 5 to 50 mole % 2,2,4,4-tetramethyl-1,3-cyclobutanediol and 50 to 95 mole % 1,4-cyclohexanedimethanol; 5 to less than 50 mole % 2,2,4,4-tetramethyl-1,3-cyclobutanediol and greater than 50 to 95 mole % 1,4-cyclohexanedimethanol; 5 to 45 mole % 2,2,4,4-tetramethyl-1,3-cyclobutanediol and 55 to 95 mole % 1,4-cyclohexanedimethanol; 5 to 40 mole % 2,2,4,4-tetramethyl-1,3-cyclobutanediol and 60 to 95 mole % 1,4-cyclohexanedimethanol; 5 to 35 mole % 2,2,4,4-tetramethyl-1,3-cyclobutanediol and 65 to 95 mole % 1,4-cyclohexanedimethanol; 5 to less than 35 mole % 2,2,4,4-tetramethyl-1,3-cyclobutanediol and greater than 65 to 95 mole % 1,4-cyclohexanedimethanol; 5 to 30 mole % 2,2,4,4-tetramethyl-1,3-cyclobutanediol and 70 to 95 mole % 1,4-cyclohexanedimethanol; 5 to 25 mole % 2,2,4,4-tetramethyl-1,3-cyclobutanediol and 75 to 95 mole % 1,4-cyclohexanedimethanol; 5 to 20 mole % 2,2,4,4-tetramethyl-1,3-cyclobutanediol and 80 to 95 mole % 1,4-cyclohexanedimethanol; 5 to 15 mole % 2,2,4,4-tetramethyl-1,3-cyclobutanediol and 85 to 95 mole % 1,4-cyclohexanedimethanol; and 5 to 10 mole % 2,2,4,4-tetramethyl-1,3-cyclobutanediol and 75 to 90 mole % 1,4-cyclohexanedimethanol.

In other aspects of the invention, the glycol component for the TMCD copolyesters useful in the invention include, but are not limited to, at least one of the following combinations of ranges: 10 to 50 mole % 2,2,4,4-tetramethyl-1,3-cyclobutanediol and 50 to 90 mole % 1,4-cyclohexanedimethanol; 10 to less than 50 mole % 2,2,4,4-tetramethyl-1,3-cyclobutanediol and greater than 50 to 90 mole % 1,4-cyclohexanedimethanol; 10 to 45 mole % 2,2,4,4-tetramethyl-1,3-cyclobutanediol and 55 to 90 mole % 1,4-cyclohexanedimethanol; 10 to 40 mole % 2,2,4,4-tetramethyl-1,3-cyclobutanediol and 60 to 90 mole % 1,4-cyclohexanedimethanol; 10 to 35 mole % 2,2,4,4-tetramethyl-1,3-cyclobutanediol and 65 to 90 mole % 1,4-cyclohexanedimethanol; 10 to less than 35 mole % 2,2,4,4-tetramethyl-1,3-cyclobutanediol and greater than 65 up to 90 mole % 1,4-cyclohexanedimethanol; 10 to 30 mole % 2,2,4, 4-tetramethyl-1,3-cyclobutanediol and 70 to 90 mole % 1,4-cyclohexanedimethanol; and 10 to 25 mole % 2,2,4,4-tetramethyl-1,3-cyclobutanediol and greater than 75 to 90 mole % 1,4-cyclohexanedimethanol.

In other aspects of the invention, the glycol component for the TMCD copolyesters useful in the invention include, but are not limited, to at least one of the following combinations of ranges: 15 to 50 mole % 2,2,4,4-tetramethyl-1,3-cyclobutanediol and 50 to 85 mole % 1,4-cyclohexanedimethanol; 15 to less than 50 mole % 2,2,4,4-tetramethyl-1,3-cyclobutanediol and greater than 50 up to 85 mole % 1,4-cyclohexanedimethanol; 15 to 45 mole % 2,2,4,4-tetramethyl-1,3-cyclobutanediol and 55 to 85 mole % 1,4-cyclohexanedimethanol; 15 to 40 mole % 2,2,4,4-tetramethyl-1,3-cyclobutanediol and 60 to 85 mole % 1,4-cyclohexanedimethanol; 15 to 35 mole % 2,2,4,4-tetramethyl-1,3-cyclobutanediol and 65 to 85 mole % 1,4-cyclohexanedimethanol; 15 to 30 mole % 2,2,4,4-tetramethyl-1,3-cyclobutanediol and 70 to 85 mole % 1,4-cyclohexanedimethanol; and 15 to 25 mole % 2,2,4,4-tetramethyl-1,3-cyclobutanediol and 75 to 85 mole % 1,4-cyclohexanedimethanol.

In other aspects of the invention, the glycol component for the TMCD copolyesters useful in the invention include, but are not limited to, at least one of the following combinations of ranges: 20 to 50 mole % 2,2,4,4-tetramethyl-1,3-cyclobutanediol and 50 to 80 mole % 1,4-cyclohexanedimethanol; 20 to 45 mole % 2,2,4,4-tetramethyl-1,3-cyclobutanediol and 55 to 80 mole % 1,4-cyclohexanedimethanol; 20 to 40 mole % 2,2,4,4-tetramethyl-1,3-cyclobutanediol and 60 to 80 mole % 1,4-cyclohexanedimethanol; 20 to 35 mole % 2,2,4,4-tetramethyl-1,3-cyclobutanediol and 65 to 80 mole % 1,4-cyclohexanedimethanol; 20 to 30 mole % 2,2,4,4-tetramethyl-1,3-cyclobutanediol and 70 to 80 mole % 1,4-cyclohexanedimethanol; and 20 to 25 mole % 2,2,4,4-tetramethyl-1,3-cyclobutanediol and 75 to 80 mole % 1,4-cyclohexanedimethanol.

In other aspects of the invention, the glycol component for the TMCD copolyesters useful in the invention include, but are not limited to, at least one of the following combinations of ranges: 25 to 50 mole % 2,2,4,4-tetramethyl-1,3-cyclobutanediol and 50 to 75 mole % 1,4-cyclohexanedimethanol; 25 to 45 mole % 2,2,4,4-tetramethyl-1,3-cyclobutanediol and 55 to 75 mole % 1,4-cyclohexanedimethanol; 25 to 40 mole % 2,2,4,4-tetramethyl-1,3-cyclobutanediol and 60 to 75 mole % 1,4-cyclohexanedimethanol; 25 to 35 mole % 2,2,4,4-tetramethyl-1,3-cyclobutanediol and 65 to 75 mole % 1,4-cyclohexanedimethanol; and 25 to 30 mole % 2,2,4,4-tetramethyl-1,3-cyclobutanediol and 70 to 75 mole % 1,4-cyclohexanedimethanol.

In other aspects of the invention, the glycol component for the TMCD copolyesters useful in the invention include, but are not limited to, at least one of the following combinations of ranges: 30 to 50 mole % 2,2,4,4-tetramethyl-1,3-cyclobutanediol and 50 to 70 mole % 1,4-cyclohexanedimethanol; 30 to 45 mole % 2,2,4,4-tetramethyl-1,3-cyclobutanediol and 55 to 70 mole % 1,4-cyclohexanedimethanol; 30 to 40 mole % 2,2,4,4-tetramethyl-1,3-cyclobutanediol and 60 to 70 mole % 1,4-cyclohexanedimethanol; and 30 to 35 mole % 2,2,4,4-tetramethyl-1,3-cyclobutanediol and 65 to 70 mole % 1,4-cyclohexanedimethanol.

For certain embodiments of the invention, the polyesters useful in the invention may exhibit at least one of the following inherent viscosities as determined in 60/40 (wt/wt) phenol/tetrachloroethane at a concentration of 0.5 g/100 ml at 25° C.: 0.35 to 1.2 dL/g; 0.35 to 1.1 dL/g; 0.35 to 1 dL/g; 0.35 to less than 1 dL/g; 0.35 to 0.98 dL/g; 0.35 to 0.95 dL/g; 0.35 to 0.90 dL/g; 0.35 to 0.85 dL/g; 0.35 to 0.80 dL/g; 0.35 to 0.75 dL/g; 0.35 to less than 0.75 dL/g; 0.35 to 0.72 dL/g; 0.35 to 0.70 dL/g; 0.35 to less than 0.70 dL/g; 0.35 to 0.68 dL/g; 0.35 to less than 0.68 dL/g; 0.35 to 0.65 dL/g; 0.40 to 1.2 dL/g; 0.40 to 1.1 dL/g; 0.40 to 1 dL/g; 0.40 to less than 1 dL/g; 0.40 to 0.98 dL/g; 0.40 to 0.95 dL/g; 0.40 to 0.90 dL/g; 0.40 to 0.85 dL/g; 0.40 to 0.80 dL/g; 0.40 to 0.75 dL/g; 0.40 to less than 0.75 dL/g; 0.40 to 0.72 dL/g; 0.40 to 0.70 dL/g; 0.40 to less than 0.70 dL/g; 0.40 to 0.68 dL/g; 0.40 to less than 0.68 dL/g.

For certain embodiments of the invention, the polyesters useful in the invention may exhibit at least one of the following inherent viscosities as determined in 60/40 (wt/wt) phenol/tetrachloroethane at a concentration of 0.5 g/100 ml at 25° C.: 0.45 to 1.2 dL/g; 0.45 to 1.1 dL/g; 0.45 to 1 dL/g; 0.45 to 0.98 dL/g; 0.45 to 0.95 dL/g; 0.45 to 0.90 dL/g; 0.45 to 0.85 dL/g; 0.45 to 0.80 dL/g; 0.45 to 0.75 dL/g; 0.45 to less than 0.75 dL/g; 0.45 to 0.72 dL/g; 0.45 to 0.70 dL/g; 0.45 to less than 0.70 dL/g; 0.45 to 0.68 dL/g; 0.45 to less than 0.68 dL/g; 0.45 to 0.65 dL/g; 0.50 to 1.2 dL/g; 0.50 to 1.1 dL/g; 0.50 to 1 dL/g; 0.50 to less than 1 dL/g; 0.50 to 0.98 dL/g; 0.50 to 0.95 dL/g; 0.50 to 0.90 dL/g; 0.50 to 0.85 dL/g; 0.50 to 0.80 dL/g; 0.50 to 0.75 dL/g; 0.50 to less than 0.75 dL/g; 0.50 to 0.72 dL/g; 0.50 to 0.70 dL/g; 0.50 to less than 0.70 dL/g; 0.50 to 0.68 dL/g; 0.50 to less than 0.68 dL/g; 0.50 to 0.65 dL/g; 0.55 to 1.2 dL/g; 0.55 to 1.1 dL/g; 0.55 to 1 dL/g; 0.55 to less than 1 dL/g; 0.55 to 0.98 dL/g; 0.55 to 0.95 dL/g; 0.55 to 0.90 dL/g; 0.55 to 0.85 dL/g; 0.55 to 0.80 dL/g; 0.55 to 0.75 dL/g; 0.55 to less than 0.75 dL/g; 0.55 to 0.72 dL/g; 0.55 to 0.70 dL/g; 0.55 to less than 0.70 dL/g; 0.55 to 0.68 dL/g; 0.55 to less than 0.68 dL/g; 0.55 to 0.65 dL/g; 0.58 to 1.2 dL/g; 0.58 to 1.1 dL/g; 0.58 to 1 dL/g; 0.58 to less than 1 dL/g; 0.58 to 0.98 dL/g; 0.58 to 0.95 dL/g; 0.58 to 0.90 dL/g; 0.58 to 0.85 dL/g; 0.58 to 0.80 dL/g; 0.58 to 0.75 dL/g; 0.58 to less than 0.75 dL/g; 0.58 to 0.72 dL/g; 0.58 to 0.70 dL/g; 0.58 to less than 0.70 dL/g; 0.58 to 0.68 dL/g; 0.58 to less than 0.68 dL/g; 0.58 to 0.65 dL/g; 0.60 to 1.2 dL/g; 0.60 to 1.1 dL/g; 0.60 to 1 dL/g; 0.60 to less than 1 dL/g; 0.60 to 0.98 dL/g; 0.60 to 0.95 dL/g; 0.60 to 0.90 dL/g; 0.60 to 0.85 dL/g; 0.60 to 0.80 dL/g; 0.60 to 0.75 dL/g; 0.60 to less than 0.75 dL/g; 0.60 to 0.72 dL/g; 0.60 to 0.70 dL/g; 0.60 to less than 0.70 dL/g; 0.60 to 0.68 dL/g; 0.60 to less than 0.68 dL/g; 0.60 to 0.65 dL/g; 0.65 to 1.2 dL/g; 0.65 to 1.1 dL/g; 0.65 to 1 dL/g; 0.65 to less than 1 dL/g; 0.65 to 0.98 dL/g; 0.65 to 0.95 dL/g; 0.65 to 0.90 dL/g; 0.65 to 0.85 dL/g; 0.65 to 0.80 dL/g; 0.65 to 0.75 dL/g; and 0.65 to less than 0.75 dL/g.

It is contemplated that the polyester compositions of the invention can possess at least one of the inherent viscosity ranges described herein and at least one of the monomer ranges for the compositions described herein unless otherwise stated. It is also contemplated that the polyester compositions of the invention can possess at least one of the Tg ranges described herein and at least one of the monomer ranges for the compositions described herein unless otherwise stated. It is also contemplated that the polyester compositions of the invention can posses at least one of the Tg ranges described herein, at least one of the inherent viscosity ranges described herein and at least one of the monomer ranges for the compositions described herein unless otherwise stated.

For the desired TMCD copolyesters, the molar ratio of cis/trans 2,2,4,4-tetramethyl-1,3-cyclobutanediol can vary from the pure form of each or mixtures thereof. In certain embodiments, the molar percentages for cis and/or trans 2,2,4,4-tetramethyl-1,3-cyclobutanediol are greater than 50 mole % cis and less than 50 mole % trans; or greater than 55 mole % cis and less than 45 mole % trans; or 30 to 70 mole % cis and 70 to 30% trans; or 40 to 60 mole % cis and 60 to 40 mole % trans; or 50 to 70 mole % trans and 50 to 30 mole % cis; or 50 to 70 mole % cis and 50 to 30% trans or 60 to 70 mole % cis and 30 to 40 mole % trans; or greater than 70 mole % cis and less than 30 mole % trans; wherein the total sum of the mole percentages for cis- and trans-2,2,4,4-tetramethyl-1,3-cyclobutanediol is equal to 100 mole %.

The molar ratio of cis/trans 1,4-cyclohexandimethanol for the TMCD copolyesters can vary within the range of 50/50 to 0/100, for example, between 40/60 to 20/80.

In certain embodiments, terephthalic acid, or an ester thereof, such as, for example, dimethyl terephthalate, or a mixture of terephthalic acid and an ester thereof, makes up most or all of the dicarboxylic acid component used to form the polyesters useful in the invention. In certain embodiments, terephthalic acid residues can make up a portion or all of the dicarboxylic acid component used to form the present polyester at a concentration of at least 70 mole %, such as at least 80 mole %, at least 90 mole %, at least 95 mole %, at least 99 mole %, or 100 mole %. In certain embodiments, polyesters with higher amounts of terephthalic acid can be used in order to produce higher impact strength properties. For purposes of this disclosure, the terms "terephthalic acid" and "dimethyl terephthalate" are used interchangeably herein. In one embodiment, dimethyl terephthalate is part or all of the dicarboxylic acid component used to make the polyesters useful in the present invention. In all embodiments, ranges of from 70 to 100 mole %; or 80 to 100 mole %; or 90 to 100 mole %; or 99 to 100 mole %; or 100 mole % terephthalic acid and/or dimethyl terephthalate and/or mixtures thereof may be used.

In addition to dimethyl terephthalate residues, the dicarboxylic acid component of the polyesters useful in the invention can comprise up to 50 mole %, up to 40 mole %, up to 30 mole %, up to 20 mole %, up to 10 mole %, up to 5 mole %, or up to 1 mole % of one or more modifying aromatic dicarboxylic acids. Yet another embodiment contains 0 mole % modifying aromatic dicarboxylic acids. Thus, if present, it is contemplated that the amount of one or more modifying aromatic dicarboxylic acids can range from any of these preceding endpoint values including, for example, from 0.01 to 30 mole %, from 0.01 to 20 mole %, from 0.01 to 10 mole %, from 0.01 to 5 mole %, or from 0.01 to 1 mole % of one or more modifying aromatic dicarboxylic acids. In one embodiment, modifying aromatic dicarboxylic acids that may be used in the present invention include, but are not limited to, those having up to 20 carbon atoms and that can be linear, para-oriented, or symmetrical. Examples of modifying aromatic dicarboxylic acids which may be used in this invention include, but are not limited to, isophthalic acid, 4,4-biphenyldicarboxylic acid, 1,4-, 1,5-, 2,6-, 2,7-naphthalenedicarboxylic acid, and trans-4,4-stilbenedicarboxylic acid, and esters thereof. In one embodiment, isophthalic acid is the modifying aromatic dicarboxylic acid. In one embodiment, dimethyl isophthalate is used. In one embodiment, dimethyl naphthalate is used.

The carboxylic acid component of the polyesters useful in the invention can be further modified with up to 10 mole %, such as up to 5 mole % or up to 1 mole % of one or more aliphatic dicarboxylic acids containing 2-16 carbon atoms, such as, for example, malonic, succinic, glutaric, adipic, pimelic, suberic, azelaic and dodecanedioic dicarboxylic acids or their corresponding esters including but not limited to dimethyl adipate, dimethyl glutarate and dimethyl succinate. Certain embodiments can also comprise 0.01 or more mole %, such as 0.1 or more mole %, 1 or more mole %, 5 or more mole %, or 10 or more mole % of one or more modifying aliphatic dicarboxylic acids. Yet another embodiment contains 0 mole % modifying aliphatic dicarboxylic acids. Thus, if present, it is contemplated that the amount of one or more modifying aliphatic dicarboxylic acids can range from any of these preceding endpoint values including, for example, from 0.01 to 10 mole % and from 0.1 to 10 mole %. The total mole % of the dicarboxylic acid component is 100 mole %.

In one embodiment, only esters of terephthalic acid and esters of the other modifying dicarboxylic acids may be used instead of the dicarboxylic acids. Suitable examples of dicarboxylic acid esters include, but are not limited to, the dimethyl, diethyl, dipropyl, diisopropyl, dibutyl, and diphenyl esters. In one embodiment, the esters are chosen from at least one of the following: methyl, ethyl, propyl, and phenyl esters.

In one embodiment of the invention, the glycol component of the polyester portion of the polyester compositions useful in the invention can contain modifying glycols which are not 2,2,4,4-tetramethyl-1,3-cyclobutanediol or 1,4-cyclohexanedimethanol; in one embodiment, the polyesters useful in the invention can contain less than 30 mole % of one or more modifying glycols. In another embodiment, the polyesters useful in the invention can contain 20 mole % or less of one or more modifying glycols. In another embodiment, the polyesters useful in the invention can contain 10 mole % or less of one or more modifying glycols. In another embodiment, the polyesters useful in the invention can contain 5 mole % or less of one or more modifying glycols. In another embodiment, the polyesters useful in the invention may contain 0 mole % modifying glycols. Certain embodiments can also contain 0.01 or more mole %, such as 0.1 or more mole %, 1 or more mole % of one or more modifying glycols. Thus, if present, it is contemplated that the amount of one or more modifying glycols can range from any of these preceding endpoint values including, for example, from 0.01 to 15 mole % and from 0.1 to 10 mole %.

Modifying glycols useful in the polyesters useful in the invention can contain 2 to 16 carbon atoms. For TMCD copolyesters, a modifying glycol can be residues of ethylene glycol. Examples of other suitable modifying glycols include, but are not limited to, diethylene glycol, 1,2-propanediol, 1,3-propanediol, neopentyl glycol, 1,4-butanediol, 1,5-pentanediol, 1,6-hexanediol, p-xylene glycol or mixtures thereof. In another TMCD copolyester embodiment, ethylene glycol is excluded as a modifying diol.

The polyesters useful in the polyesters compositions of the invention can comprise from 0 to 10 mole percent, for example, from 0.01 to 5 mole percent, from 0.01 to 1 mole percent, from 0.05 to 5 mole percent, from 0.05 to 1 mole percent, or from 0.1 to 0.7 mole percent, or 0.1 to 0.5 mole percent, based the total mole percentages of either the diol or diacid residues; respectively, of one or more residues of a branching monomer, also referred to herein as a branching agent, having 3 or more carboxyl substituents, hydroxyl substituents, or a combination thereof. In certain embodiments, the branching monomer or agent may be added prior to and/or during and/or after the polymerization of the polyester. The polyester(s) useful in the invention can thus be linear or branched.

Examples of branching monomers include, but are not limited to, multifunctional acids or multifunctional alcohols such as trimellitic acid, trimellitic anhydride, pyromellitic dianhydride, trimethylolpropane, glycerol, pentaerythritol, citric acid, tartaric acid, 3-hydroxyglutaric acid and the like. In one embodiment, the branching monomer residues can comprise 0.1 to 0.7 mole percent of one or more residues chosen from at least one of the following: trimellitic anhydride, pyromellitic dianhydride, glycerol, sorbitol, 1,2,6-hexanetriol, pentaerythritol, trimethylolethane, and/or trimesic acid. The branching monomer may be added to the polyester reaction mixture or blended with the polyester in the form of a concentrate as described, for example, in U.S. Pat. Nos. 5,654,347 and 5,696,176, whose disclosure regarding branching monomers is incorporated herein by reference.

The polyesters may be prepared by any method known to one of ordinary skill in the art.

The acrylic polymer(s) useful in the invention are comprised of monomers or mixtures of monomers including, but not limited to: methyl acrylate, butyl acrylate, methyl methacrylate, ethyl acrylate, ethyl methacrylate, butyl acrylate, butyl methacrylate, cyclohexylacrylate, cyclohexylmethacrylate, styrene, methylstyrene, and other monomers known to function in a similar manner to any of the monomers listed above. These acrylic polymers may be prepared by methods which are well known in the art. See Encyclopedia of Polymer Science and Technology, John Wiley & Sons (1985).

In one embodiment of the invention, polyacrylates such as polymethyl methacrylate (PMMA), polyethyl methacrylate (PEMA), or copolymers thereof are useful in the invention such as those which are commercially available from Rohm and Haas. Copolymers such as styrene-methylmethacrylate copolymer (NAS) are useful in one embodiment of the invention. Styrene:methylmethacrylate copolymer (70:30) (NAS 30) is useful in another embodiment of the invention. In addition, styrene acrylonitrile (SAN) can also be useful in the invention. These are common commercial polymers which are available from companies such as Air Products and Chemicals, Inc. In one embodiment, the polyacrylate useful in the invention is PMMA.

The inherent viscosity of the acrylic polymer or copolymer can be 0.2 dL/g or more, or 0.4 dL/g, or more, or 0.2 to 1.2 dL/g. or 0.40 to 1.2 dL/g.

Both types of phenolic antioxidants are commercially available and can be added to a polymer via compounding after polymerization and prior to molding.

In one embodiment, the conditions for the term "effective stabilizing amount" are met either if the stabilizing composition of the invention is present in an amount sufficient to provide the specified transmission rates described herein for the polymers specified or if the loading levels of the stabilizing composition of the invention as are specified for the types of polymers useful in the invention.

In one embodiment, the polymer compositions containing the stabilizing compositions of the invention, for example, the TMCD copolyester compositions, can have a transmission percentage of at least 75% or at least 70% or at least 65% or at least 60% as determined by the method described in the Examples herein and under the conditions described in Table 4.

In one embodiment, the polymer compositions containing the stabilizing compositions of the invention for example, the TMCD copolyester compositions, can have a transmission percentage of at least 75% or at least 70% or at least 65% or at least 60% as determined by the method described herein when using canola oil or soybean oil as determined by the method described in the Examples herein and under the conditions described in Table 4.

In one embodiment, the polymer compositions containing the stabilizing compositions of the invention, for example, the TMCD copolyester compositions, can have a transmission percentage of at least 75% or at least 70% or at least 65% or at least 60% as determined by the method described herein when using canola oil or soybean oil and when using Detergent 1 as determined by the method described in the Examples herein and under the conditions described in Table 4 when using Detergent 1.

In one embodiment, the polymer compositions containing the stabilizing compositions of the invention, for example, the acrylic polymer compositions, can have a transmission percentage of at least 75% or at least 70% or at least 65% or at least 60% or at least 55% or at least 50% or at least 45% or at least 40% as determined by the method described in the Examples and under the conditions described in Table 5 and Table 12 herein.

In one embodiment, the polymer compositions containing the stabilizing compositions of the invention, for example, the acrylic polymer compositions, can have a transmission percentage of at least 75% or at least 70% or at least 65% or at least 60% or at least 55% or at least 50% or at least 45% or at least 40% as determined by the method described in the Examples and under the conditions described in Table 5 and Table 12 when using canola oil.

In one embodiment, the polymer compositions containing the stabilizing compositions of the invention, for example, the acrylic polymer compositions, can have a transmission percentage of at least 75% or at least 70% or at least 65% or at least 60% or at least 55% or at least 50% or at least 45% or at least 40% as determined by the method described in the Examples and under the conditions described in Table 5 and Table 12 herein when using canola oil and when using Detergent 1.

In one embodiment, the polymer compositions containing the stabilizing compositions of the invention, for example, the NAS polymer compositions useful in the invention, can have a transmission percentage of at least 75% or at least 70% or at least 65% or at least 60% as determined by the method described in the Examples and under the conditions described in Table 5 and Table 12 herein.

In one embodiment, the polymer compositions containing the stabilizing compositions of the invention, for example, the NAS polymer compositions, can have a transmission percentage of at least 75% or at least 70% or at least 65% or at least 60% a as determined by the method described in the Examples and under the conditions described in Table 5 and Table 12 herein when using canola oil.

In one embodiment, the polymer compositions containing the stabilizing compositions of the invention, for example, the NAS polymer compositions, can have a transmission percentage of at least 75% or at least 70% or at least 65% or at least 60% as determined by the method described in the Examples and under the conditions described in Table 5 and Table 12 herein when using canola oil and when using Detergent 1.

In one embodiment, the polymer compositions containing the stabilizing compositions of the invention, for example, the PMMA polymer compositions can have a transmission percentage of at least 50% or at least 45% or at least 40% as determined by the method described in the Examples and under the conditions described in Table 5 and Table 12 herein.

In one embodiment, the polymer compositions containing the stabilizing compositions of the invention, for example, the PMMA polymer compositions, can have a transmission percentage of at least 50% or at least 45% or at least 40% as determined by the method described in the Examples and under the conditions described in Table 5 and Table 12 herein when using canola oil.

In one embodiment, the polymer compositions containing the stabilizing compositions of the invention, for example, the PMMA polymer compositions, can have a transmission percentage of at least 50% or at least 45% or at least 40% as determined by the method described in the Examples and under the conditions described in Table 5 and Table 12 herein when using canola oil and when using Detergent 1.

In one embodiment, the polymers useful in the invention and/or the polymer compositions of the invention, with or without toners, can have color values L*, a* and b* which can be determined using a Hunter Lab Ultrascan Spectra Colorimeter manufactured by Hunter Associates Lab Inc., Reston, Va. The color determinations are averages of values measured on either pellets of the polymers or plaques or other items injection molded or extruded from them. They are determined by the L*a*b* color system of the CIE (International Commission on Illumination) (translated), wherein L* represents the lightness coordinate, a* represents the red/green coordinate, and b* represents the yellow/blue coordinate. In certain embodiments, the b* values for the polymers useful in the invention can be from −10 to less than 10 and the L* values can be from 50 to 90. In other embodiments, the b* values for the polymers useful in the invention can be present in one of the following ranges: −10 to 9; −10 to 8; −10 to 7; −10 to 6; −10 to 5; −10 to 4; −10 to 3; −10 to 2; from −5 to 9; −5 to 8; −5 to 7; −5 to 6; −5 to 5; −5 to 4; −5 to 3; −5 to 2; 0 to 9; 0 to 8; 0 to 7; 0 to 6; 0 to 5; 0 to 4; 0 to 3; 0 to 2; 1 to 10; 1 to 9; 1 to 8; 1 to 7; 1 to 6; 1 to 5; 1 to 4; 1 to 3; and 1 to 2. In other embodiments, the L* value for the polymers useful in the invention can be present in one of the following ranges: 50 to 60; 50 to 70; 50 to 80; 50 to 90; 60 to 70; 60 to 80; 60 to 90; 70 to 80; 79 to 90.

In addition, the polymer compositions useful in this invention may also contain from 0.01 to 25% by weight or 0.01 to 20% by weight or 0.01 to 15% by weight or 0.01 to 10% by weight or 0.01 to 5% by weight of the total weight of the polymer composition of common additives such as colorants, dyes, mold release agents, flame retardants, plasticizers, nucleating agents, stabilizers, including but not limited to, UV stabilizers, thermal stabilizers and/or reaction products thereof, fillers, and impact modifiers. Examples of typical commercially available impact modifiers well known in the art and useful in this invention include, but are not limited to, ethylene/propylene terpolymers; functionalized polyolefins, such as those containing methyl acrylate and/or glycidyl methacrylate; styrene-based block copolymeric impact modifiers; and various acrylic core/shell type impact modifiers. For example, UV additives can be incorporated into articles of manufacture through addition to the bulk, through application of a hard coat, or through coextrusion of a cap layer. Residues of such additives are also contemplated as part of the polymer composition.

The polymers of the invention can comprise at least one chain extender. Suitable chain extenders include, but are not limited to, multifunctional (including, but not limited to, bifunctional) isocyanates, multifunctional epoxides, including for example, epoxylated novolacs, and phenoxy resins. In certain embodiments, chain extenders may be added at the end of the polymerization process or after the polymerization process. If added after the polymerization process, chain extenders can be incorporated by compounding or by addition during conversion processes such as injection molding or extrusion. The amount of chain extender used can vary depending on the specific monomer composition used and the physical properties desired but is generally about 0.1 percent by weight to about 10 percent by weight, preferably about 0.1 to about 5 percent by weight, based on the total weight of the polymer.

Reinforcing materials may be useful in the polymer compositions of this invention. The reinforcing materials may include, but are not limited to, carbon filaments, silicates, mica, clay, talc, titanium dioxide, Wollastonite, glass flakes, glass beads and fibers, and polymeric fibers and combinations thereof. In one embodiment, the reinforcing materials are glass, such as, fibrous glass filaments, mixtures of glass and talc, glass and mica, and glass and polymeric fibers.

The polymer compositions of this invention can be blended with any other polymer known in the art. For example, the polymer composition of the invention can comprise at least one polymer chosen from at least one of the following: poly (etherimides), polyphenylene oxides, poly(phenylene oxide)/polystyrene blends, polystyrene resins, polyphenylene sulfides, polyphenylene sulfide/sulfones, poly(estercarbonates), polycarbonates, polysulfones; polysulfone ethers, and poly(ether-ketones).

In another embodiment, the invention further relates to articles of manufacture comprising any of the polymers and blends described above.

The polymer compositions and/or polymer blend compositions can be useful in forming fibers, films, molded articles, containers, and sheeting. The methods of forming the polymers into fibers, films, molded articles, containers, and sheeting are well known in the art.

As used herein, the abbreviation "wt" means "weight". The inherent viscosity of the polymers, for example, the polyesters was determined in 60/40 (wt/wt) phenol/tetrachloroethane at a concentration of 0.5 g/100 ml at 25° C.

The following examples further illustrate how the compositions of matter of the invention can be made and evaluated, and are intended to be purely exemplary of the invention and are not intended to limit the scope thereof. Unless indicated otherwise, parts are parts by weight, temperature is in degrees C. or is at room temperature, loading level is measured in units of weight percentage as measured by HPLC analysis based on the total weight of the polymer composition; and pressure is at or near atmospheric.

EXAMPLES

The following abbreviations apply throughout the working examples and specification:

TABLE 1

| | |
|---|---|
| AO Phosphite | Tris(2,4-di-tert-butylphenyl) Phosphite |
| AO 800 | Sulfanylpropanoate |
| AO 802 | Dioctadecyl 3,3'-thiodipropionate |
| AO 1076 | Octadecyl-3-(3,5-di-tert-butyl-4-hydroxyphenyl)-propionate [a phenolic antioxidant (2)] |
| BHA | Butylated hydroxyanisole [a phenolic antioxidant (1)] |
| BHT | Butylated hydroxytoluene [a phenolic antioxidant (1)] |
| Copolyester A | A polyester comprising 33 mole % 2,2,4,4-tetramethyl-1,3-cyclobutanediol residues, 67 mole % 1,4-cyclohexanedimethanol residues, and 100 mole % terephthalic acid residues having an inherent viscosity of 0.64 dL/g |
| Copolyester B | Poly(ethylene terephthalate) modified with 31 mole % 1,4-cyclohexanedimethanol having an inherent viscosity of 0.75 dL/g |
| Copolyester C | A polyester comprising 23 mole % 2,2,4,4-tetramethyl-1,3-cyclobutanediol residues, 77 mole % 1,4-cyclohexanedimethanol residues, and 100 mole % terephthalic acid residues having an inherent viscosity of 0.72 dL/g |
| HPLC | High Performance Liquid Chromatography |
| NAS (NAS 30) | Styrene:Methylmethacrylate Copolymer (70:30) |
| NIST | National Institute of Standards and Technology |
| NMR | Nuclear Magnetic Resonance Spectroscopy |
| OSD | Oxidative Surface Degradation |
| PMMA | Polymethyl Methacrylate Polymer |
| SAN | Styrene-Acrylonitrite Polymer |
| TBHQ | Tert-butylhydroquinone [a phenolic antioxidant (1)] |
| Vitamin E | α-tocopherol [a phenolic antioxidant (2)] |

Preparation for Examples

Samples were created to examine the efficacy of different loading levels by utilizing a master batch technique. The master batch of antioxidant loaded material was compounded using a 57 mm co-rotating intermeshing twin screw extruder, screw design Eastman #121, using 6.25% loading for both BHT and AO 1076 with Copolyester C. Copolyester C and BHT were fed in barrel 1, while AO 1076 was fed downstream in barrel 5. The temperature profile was as follows: zones 2 and 3 220° C., zones 4-10 246° C., and the 6 hole die 265° C. The screw speed was 300 RPM with a feed rate of 150 lb/hr. HPLC analysis shows actual loading levels of 5.57% BHT and 5.78% AO 1076. Samples were then created by blending the master batch pellets with additional Copolyester A pellets to create different antioxidant loading levels.

The window of usefulness was defined by using a similar technique to one popular in the fiber reinforced composites arena to quantify the level of surface degradation in a polymeric material. Samples were first exposed to an oil for 24 h at 95° C. and then exposed to a detergent solution for up to 24 h at 95° C. After this exposure these samples may show a whitened appearance characteristic of oxidative surface degradation. To quantify this, a sample was placed on a high resolution (at least 1200 dpi) flatbed scanner in a room with no ambient or other artificial lighting, and imaged. This results in a captured image with a black background contrasting any whitened regions on the polymer. The image was then opened in ImageJ software, provided by NIST at no cost to all users, and converted into a binary image. The binary image was then analyzed to count the number of black vs. white pixels resulting in a percent area that showed surface degradation. In defining the window of usefulness for the antioxidant additives a percent transmission was used, defined hence forth as 100 minus the percent area showing surface degradation. The loading levels that showed the highest transmission in multiple applications were chosen as the appropriate loading window.

The level of antioxidant in a polymeric material was measured using HPLC with ultraviolet and charged aerosol detection. The samples underwent a liquid-liquid extraction, separating the antioxidants from the plastic material. For all antioxidants containing hindered phenolic compounds, levels were detected by exposing the chromaphoric nature of the phenyl functionality. For other antioxidants, detection was performed by exploiting the size of the compounds using charged aerosol detection. An external control was performed for all antioxidants examined and both detection methods employed. Control samples were prepared from standard materials at matrix comparable levels to ensure method reproducibility, while samples were also spiked with known concentrations of antioxidant standards. The recovered antioxidant level from the control samples was then compared with the spike loading level to validate the method calibration.

To test the efficacy of the antioxidant additives the following oxidative surface degradation testing (OSD testing) was performed. Each material was molded into 10.16×10.16×0.318 cm plaques that were then cut into 2.54×2.54×0.318 cm squares and a 0.635 cm diameter hole was drilled in the center. Four squares were then placed in an oil, as listed in Table 2 below, for 24 hours at 95° C. and upon removal were hand washed with Dawn Ultra dish washing liquid commercially available from Proctor and Gamble, Cincinnati, Ohio. Four squares were then placed on a screw with washers in between each square, and the squares were then immersed in 40 mL of a commercial dish detergent solution, as listed in Table 3 below, for up to 24 hrs at 95° C. All dish detergents are commercially available for commercial warewashing. A summary of all of the examples tested is shown in Table 13.

TABLE 2

| Oils used for OSD testing. Oils Used for OSD Testing |
| --- |
| Olive Oil |
| Canola Oil |
| Soybean Oil |
| Corn Oil |

The oils listed in Table 2 are commonly known in the art and are commercially available under the following brand names: Olive Oil—Pompeian, Canola Oil—Best Choice, Soybean Salad Oil—Golden Chef, and Corn Oil—Mazola.

TABLE 3

Detergents used for OSD testing.

| Detergents Used for OSD Testing | Designation |
| --- | --- |
| Solid Power XL | 1 |
| Apex Power | 2 |
| Omega Hi-Chlor | 3 |

The detergents listed in Table 3 are commercially available from Ecolab, Inc. Institutional Division, St. Paul, Minn. According to the Material Safety Data Sheets provided by Ecolab on its website, Solid Power XL detergent (Detergent 1) has sodium hydroxide as its primary ingredient, Apex Power (Detergent 2) has sodium carbonate as its primary ingredient; and Omega Hi Chlor (Detergent 3) has pentasodium triphosphate, sodium carbonate and phosphonic acid as its primary ingredients.

In one embodiment, acceptable transmission percentages for Copolyester A after OSD testing are as shown in Table 4.

TABLE 4

|  | Detergent 1 | Detergent 2 | Detergent 3 |
| --- | --- | --- | --- |
| Olive Oil | >90%, 12 hr detergent exposure | >65%, 8 hr detergent exposure | Not Tested |
| Canola Oil | >75% or > 70% > or > 65%; 8 hr detergent exposure | Not Tested | >80%, 8 hr detergent exposure |
| Soybean Oil | >75% or > 70% > or > 65% or > 60%, 12 hr detergent exposure | Not Tested | Not Tested |
| Corn Oil | Not Tested | Not Tested | >65%, 12 hr detergent exposure |

The invention was examined in other polymeric materials such as NAS 30, and PMMA. For each material tested, due to the differences between Copolyester A and these alternative polymers, the loading level to meet the acceptable transmission limits also differs from Copolyester A.

In one embodiment, acceptable transmission limits for NAS 30, and PMMA after OSD testing are as presented in Table 5.

TABLE 5

|  | 24 hrs Canola Oil and 24 hr Detergent 1 Exposure |
|---|---|
| NAS 30 | >40% or > 60% or > 65%> or > 70% > 75% |
| PMMA | >45% or > 47% or > 50% |

Examples 1-23 demonstrate various testing with Copolyester A in combination with canola oil and Detergent 1. Examples 24-29 demonstrate various testing with Copolyester A in combination with various oils and various detergents. Examples 30-37 demonstrate various testing with acrylic polymers with canola oil and Detergent 1. Examples 38-41 demonstrate various testing with Copolyester B with canola oil and Detergent 1. Examples 1-6 show the addition of BHT (a Phenolic Antioxidant A) and AO 1076 (a Phenolic Antioxidant B) by themselves do not improve the inhibition of surface oxidation. Example 7 contains no antioxidants.

Example 1

0.1 wt % BHT was compounded with Copolyester A using an 18 mm twin screw extruder at 265° C. and 280-300 RPMs. HPLC analysis shows actual loading levels of 0.06 wt %. The extruded material was chopped into pellets and then directly molded into 10.16×10.16×0.318 cm plaques using a Toyo 110 ton injection molding machine at 272° C. OSD testing was performed with canola oil and Detergent 1.

Example 2

0.5 wt % BHT was compounded with Copolyester A using an 18 mm twin screw extruder at 265° C. and 280-300 RPMs. HPLC analysis shows an actual loading level of 0.43 wt %. The extruded material was chopped into pellets and then directly molded into 10.16×10.16×0.318 cm plaques using a Toyo 110 ton injection molding machine at 272° C. OSD testing was performed with canola oil and Detergent 1.

Example 3

1 wt % BHT was compounded with Copolyester A using an 18 mm twin screw extruder at 265° C. and 280-300 RPMs. HPLC analysis shows an actual loading level of 0.90 wt %. The extruded material was chopped into pellets and then directly molded into 10.16×10.16×0.318 cm plaques using a Toyo 110 ton injection molding machine at 272° C. OSD testing was performed with canola oil and Detergent 1.

Example 4

0.1 wt % AO 1076 was compounded with a Copolyester A using an 18 mm twin screw extruder at 265° C. and 280-300 RPMs. HPLC analysis shows actual loading levels of 0.07 wt %. The extruded material was chopped into pellets and then directly molded into 10.16×10.16×0.318 cm plaques using a Toyo 110 ton injection molding machine at 272° C. OSD testing was performed with canola oil and Detergent 1.

Example 5

0.5 wt % AO 1076 was compounded with Copolyester A using an 18 mm twin screw extruder at 265° C. and 280-300 RPMs. HPLC analysis shows actual loading levels of 0.35 wt %. The extruded material was chopped into pellets and then directly molded into 10.16×10.16×0.318 cm plaques using a Toyo 110 ton injection molding machine at 272° C. OSD testing was performed with canola oil and Detergent 1.

Example 6

1 wt % AO 1076 was compounded with Copolyester A using an 18 mm twin screw extruder at 265° C. and 280-300 RPMs. HPLC analysis shows actual loading levels of 0.78 wt %. The extruded material was chopped into pellets and then directly molded into 10.16×10.16×0.318 cm plaques using a Toyo 110 ton injection molding machine at 272° C. OSD testing was performed with canola oil and Detergent 1.

Example 7

0 wt % antioxidant was compounded with Copolyester A using an 18 mm twin screw extruder at 265° C. and 280-300 RPMs, resulting in a material with no additive but a similar molecular weight as it had seen the same processing steps. The extruded material was chopped into pellets and then directly molded into 10.16×10.16×0.318 cm plaques using a Toyo 110 ton injection molding machine at 272° C. OSD testing was performed with canola oil and Detergent 1.

Examples 1-6 are examples that show the addition of either BHT or AO 1076 individually do not improve the inhibition of surface oxidation as shown in Table 6. Example 7 is an example containing no antioxidants as shown in Table 6. The results of Examples 8-10 are also shown in Table 6.

Example 8

0.05 wt % BHT and 0.05 wt % AO 1076 were compounded with Copolyester A using an 18 mm twin screw extruder at 265° C. and 280-300 RPMs. HPLC analysis shows actual loading levels of 0.02 wt % BHT and 0.04 wt % AO 1076. The extruded material was chopped into pellets and then directly molded into 10.16×10.16×0.318 cm plaques using a Toyo 110 ton injection molding machine at 272° C. OSD testing was performed with canola oil and Detergent 1.

Example 9

0.25 wt % BHT and 0.25 wt % AO 1076 were compounded with Copolyester A using an 18 mm twin screw extruder at 265° C. and 280-300 RPMs. NMR analysis shows actual loading levels of 0.15 wt % BHT and 0.21 wt % AO 1076. The extruded material was chopped into pellets and then directly molded into 10.16×10.16×0.318 cm plaques using a Toyo 110 ton injection molding machine at 272° C. OSD testing was performed with canola oil and Detergent 1.

Example 10

0.5 wt % BHT and 0.5 wt % AO 1076 were compounded with Copolyester A using an 18 mm twin screw extruder at 265° C. and 280-300 RPMs. NMR analysis shows actual loading levels of 0.55 wt % of BHT and 0.55 wt % AO 1076. The extruded material was chopped into pellets and then directly molded into 10.16×10.16×0.318 cm plaques using a Toyo 110 ton injection molding machine at 272° C. OSD testing was performed with canola oil and Detergent 1.

Examples 8 and 10 show that addition of BHT and AO 1076 at low and high loading levels do not improve the inhibition of surface degradation due to oxidation. Example 9 is an example that shows the unexpected synergy of BHT and AO 1076 at inhibiting surface degradation due to oxidation at a specific loading level, as compared with Examples 1-7, 8, and 10.

TABLE 6

Percent transmission measured after OSD testing for Examples 1-10.

| | Percent Transmission after 24 h in canola oil and 8 h in Detergent 1 |
|---|---|
| Example 1 | 12 |
| Example 2 | 15 |
| Example 3 | 35 |
| Example 4 | 59 |
| Example 5 | 33 |
| Example 6 | 45 |
| Example 7 | 7 |
| Example 8 | 51 |
| Example 9 | 90 |
| Example 10 | 34 |

The results of Examples 11-16 are shown in Table 7.

Example 11

0.25 wt % AO1076 and 0.25 wt % butylated hydroxyanisole (BHA) were compounded with Copolyester A using an 18 mm twin screw extruder at 265° C. and 280-300 RPMs. HPLC analysis shows actual loading levels of 0.19 wt % AO 1076 and 0.22 wt % BHA. The extruded material was chopped into pellets and then directly molded into 10.16×10.16×0.318 cm plaques using a Toyo 110 ton injection molding machine at 272° C. OSD testing was performed with canola oil and Detergent 1.

Example 12

0.25 wt % Vitamin E and 0.25 wt % BHT were compounded with Copolyester A using an 18 mm twin screw extruder at 265° C. and 280-300 RPMs. HPLC analysis shows actual loading levels of 0.17 wt % Vitamin E and 0.16 wt % BHT. The extruded material was chopped into pellets and then directly molded into 10.16×10.16×0.318 cm plaques using a Toyo 110 ton injection molding machine at 272° C. OSD testing was performed with canola oil and Detergent 1.

Example 13

0.25 wt % Vitamin E and 0.25 wt % BHA were compounded with Copolyester A using an 18 mm twin screw extruder at 265° C. and 280-300 RPMs. HPLC analysis shows actual loading levels of 0.17 wt % Vitamin E and 0.20 wt % BHA. The extruded material was chopped into pellets and then directly molded into 10.16×10.16×0.318 cm plaques using a Toyo 110 ton injection molding machine at 272° C. OSD testing was performed with canola oil and Detergent 1.

Example 14

0.25 wt % AO1076 and 0.25 wt % tert-butylhydroquinone (TBHQ) were compounded with Copolyester A using an 18 mm twin screw extruder at 265° C. and 280-300 RPMs. HPLC analysis shows actual loading levels of 0.20 wt % AO 1076 and 0.17 wt % TBHQ. The extruded material was chopped into pellets and then directly molded into 10.16×10.16×0.318 cm plaques using a Toyo 110 ton injection molding machine at 272° C. OSD testing was performed with canola oil and Detergent 1.

Example 15

0.25 wt % Vitamin E and 0.25 wt % TBHQ were compounded with Copolyester A using an 18 mm twin screw extruder at 265° C. and 280-300 RPMs. HPLC analysis shows actual loading levels of 0.22 wt % Vitamin E and 0.18 wt % TBHQ. The extruded material was chopped into pellets and then directly molded into 10.16×10.16×0.318 cm plaques using a Toyo 110 ton injection molding machine at 272° C. OSD testing was performed with canola oil and Detergent 1.

Example 16

0 wt % of any antioxidant was compounded with Copolyester A using an 18 mm twin screw extruder at 265° C. and 280-300 RPMs, resulting in a material with no additive but a similar molecular weight as it had seen the same processing steps. The extruded material was chopped into pellets and then directly molded into 10.16×10.16×0.318 cm plaques using a Toyo 110 ton injection molding machine at 272° C. OSD testing was performed with canola oil and Detergent 1.

The percent transmission of Examples 11-13, and Examples 14-16 is provided in Table 7, showing that Examples 11-13 have a greater than 70% transmission while Examples 14-16 do not.

TABLE 7

Percent transmission of Examples 11-16 after OSD testing.

| | Percent Transmission after 24 h in canola oil and 8 h in Detergent 1 |
|---|---|
| Example 11 | 79 |
| Example 12 | 82 |
| Example 13 | 75 |
| Example 14 | 69 |
| Example 15 | 48 |
| Example 16 | 7 |

The results of Examples 17-23 are shown in Table 8.

Example 17

0.25 wt % AO1076 and 0.25 wt % Tris(2,4-di-tert-butylphenyl)phosphite (AO phosphite) were compounded with Copolyester A using an 18 mm twin screw extruder at 265° C. and 280-300 RPMs. HPLC analysis shows actual loading levels of 0.19 wt % AO 1076 and 0.19 wt % AO phospite. The extruded material was chopped into pellets and then directly molded into 10.16×10.16×0.318 cm plaques using a Toyo 110 ton injection molding machine at 272° C. OSD testing was performed with canola oil and Detergent 1.

Example 18

0.25 wt % AO 1076 and 0.25 wt % dodecyl 3-(3-dodecoxy-3-oxopropyl)sulfanylpropanoate (AO 800), were compounded with Copolyester A using an 18 mm twin screw extruder at 265° C. and 280-300 RPMs. HPLC analysis shows actual loading levels of 0.19 wt % AO 1076 and 0.19 wt % AO 800. The extruded material was chopped into pellets and then directly molded into 10.16×10.16×0.318 cm plaques using a Toyo 110 ton injection molding machine at 272° C. OSD testing was performed with canola oil and Detergent 1.

Example 19

0.25 wt % AO 1076 and 0.25 wt % dioctadecyl 3,3'-thiodipropionate (AO 802) were compounded with Copolyester A using an 18 mm twin screw extruder at 265° C. and 280-300 RPMs. HPLC analysis shows actual loading levels of 0.19 wt % AO 1076 and 0.23 wt % AO 802. The extruded material was chopped into pellets and then directly molded into 10.16× 10.16×0.318 cm plaques using a Toyo 110 ton injection molding machine at 272° C. OSD testing was performed with canola oil and Detergent 1.

Example 20

0.25 wt % Vitamin E and 0.25 wt % AO phosphite were compounded with Copolyester A using an 18 mm twin screw extruder at 265° C. and 280-300 RPMs. HPLC analysis shows actual loading levels of 0.19 wt % Vitamin E and 0.15 wt % AO phosphite. The extruded material was chopped into pellets and then directly molded into 10.16×10.16×0.318 cm plaques using a Toyo 110 ton injection molding machine at 272° C. OSD testing was performed with canola oil and Detergent 1.

Example 21

0.25 wt % Vitamin E and 0.25 wt % AO 800 were compounded with Copolyester A using an 18 mm twin screw extruder at 265° C. and 280-300 RPMs. HPLC analysis shows actual loading levels of 0.18 wt % Vitamin E and 0.17 wt % AO 800. The extruded material was chopped into pellets and then directly molded into 10.16×10.16×0.318 cm plaques using a Toyo 110 ton injection molding machine at 272° C. OSD testing was performed with canola oil and Detergent 1.

Example 22

0.25 wt % Vitamin E and 0.25 wt % AO 802 were compounded with Copolyester A using an 18 mm twin screw extruder at 265° C. and 280-300 RPMs. HPLC analysis shows actual loading levels of 0.17 wt % Vitamin E and 0.24 wt % AO 802. The extruded material was chopped into pellets and then directly molded into 10.16×10.16×0.318 cm plaques using a Toyo 110 ton injection molding machine at 272° C. OSD testing was performed with canola oil and Detergent 1.

Example 23

0 wt % of any antioxidant was compounded with Copolyester A using an 18 mm twin screw extruder at 265° C. and 280-300 RPMs, resulting in a material with no additive but a similar molecular weight as it had seen the same processing steps. The extruded material was chopped into pellets and then directly molded into 10.16×10.16×0.318 cm plaques using a Toyo 110 ton injection molding machine at 272° C. OSD testing was performed with canola oil and Detergent 1.

TABLE 8

Percent transmission of Examples 17-23 after OSD testing.

|  | Percent Transmission after 24 h in canola oil and 8 h in Detergent 1 |
| --- | --- |
| Example 17 | 44 |
| Example 18 | 57 |
| Example 19 | 14 |
| Example 20 | 46 |
| Example 21 | 58 |
| Example 22 | 3 |
| Example 23 | 7 |

Example 24

Master batch pellets were blended with Copolyester A pellets prior to molding resulting in attempted loading levels of 0.1% BHT and 0.1% AO 1076. This blend was then molded into 10.16×10.16×0.318 cm plaques using a Toyo 110 ton injection molding machine at 272° C. HPLC analysis shows actual loading levels of 0.10 wt % BHT and 0.09 wt % AO 1076. OSD testing was performed with olive oil, canola oil and soybean oil each in combination with Detergent 1; olive oil with Detergent 2; and each of canola oil and corn oil in combination with Detergent 3.

Example 25

Master batch pellets were blended with Copolyester A pellets prior to molding resulting in attempted loading levels of 0.15% BHT and 0.15% AO 1076 with Copolyester A. This blend was then molded into 10.16×10.16×0.318 cm plaques using a Toyo 110 ton injection molding machine at 272° C. HPLC analysis shows actual loading levels of 0.19 wt % BHT and 0.18 wt % AO 1076. OSD testing was performed with olive oil, canola oil and soybean oil each in combination with Detergent 1; olive oil with Detergent 2; and each of canola oil and corn oil in combination with Detergent 3.

Example 26

Master batch pellets were blended with Copolyester A pellets prior to molding resulting in attempted loading levels of 0.2% BHT and 0.2% AO 1076 with Copolyester A. This blend was then molded into 10.16×10.16×0.318 cm plaques using a Toyo 110 ton injection molding machine at 272° C. HPLC analysis shows actual loading levels of 0.23 wt % BHT and 0.24 wt % AO 1076. OSD testing was performed with olive oil, canola oil and soybean oil each in combination with Detergent 1; olive oil with Detergent 2; and each of canola oil and corn oil in combination with Detergent 3.

Example 27

Master batch pellets were blended with Copolyester A pellets prior to molding resulting in attempted loading levels of 0.25% BHT and 0.25% AO 1076 with Copolyester A. This blend was then molded into 10.16×10.16×0.318 cm plaques using a Toyo 110 ton injection molding machine at 272° C. NMR analysis shows actual loading levels of 0.31 wt % BHT and 0.3 wt % AO 1076. OSD testing was performed with olive oil, canola oil and soybean oil each in combination with Detergent 1; olive oil with Detergent 2; and each of canola oil and corn oil in combination with Detergent 3.

Example 28

Master batch pellets were blended with Copolyester A pellets prior to molding resulting in attempted loading levels of 0.4% BHT and 0.4% AO 1076 with Copolyester A. This blend was then molded into 10.16×10.16×0.318 cm plaques using a Toyo 110 ton injection molding machine at 272° C. NMR analysis shows actual loading levels of 0.55 wt % BHT and 0.56 wt % AO 1076. OSD testing was performed with olive oil, canola oil and soybean oil each in combination with Detergent 1; olive oil with Detergent 2; and each of canola oil and corn oil in combination with Detergent 3.

Example 29

0 wt % of the master batch was blended with Copolyester A resulting in a material with no additive. The extruded material was chopped into pellets and then directly molded into 10.16×10.16×0.318 cm plaques using a Toyo 110 ton injection molding machine at 272° C. OSD testing was performed with olive oil, canola oil and soybean oil each in combination with Detergent 1; olive oil with Detergent 2; and each of canola oil and corn oil in combination with Detergent 3.

The percent transmission of Examples 24-29 for OSD testing performed with Detergent 1 is provided in Table 9. The percent transmission of examples 24-29 for OSD testing performed with Detergent 2 is provided in Table 10. The percent transmission of Examples 24-29 for OSD testing performed with Detergent 3 is provided in Table 11.

TABLE 9

Percent Transmission for OSD testing with Detergent 1 and Olive Oil, Canola Oil, and Soybean Oil.

|  | Olive Oil - 12 hr | Canola Oil - 8 hr | Soybean Oil - 12 hr |
|---|---|---|---|
| Example 24 | 86 | 42 | 28 |
| Example 25 | 93 | 71 | 44 |
| Example 26 | 91 | 58 | 65 |
| Example 27 | 62 | 35 | 36 |
| Example 28 | 74 | 33 | 13 |
| Example 29 | 58 | 34 | 32 |

TABLE 10

Percent transmission for OSD testing with Detergent 2 and Olive Oil

| Example | Olive Oil - 8 hr |
|---|---|
| Example 24 | 43 |
| Example 25 | 68 |
| Example 26 | 66 |
| Example 27 | 63 |
| Example 28 | 59 |
| Example 29 | 13 |

TABLE 11

Percent transmission for OSD testing with Detergent 3 Combined With Canola Oil and Soybean Oil

|  | Canola Oil - 8 hr | Soybean Oil - 12 hr |
|---|---|---|
| Example 24 | 67 | 59 |
| Example 25 | 81 | 70 |
| Example 26 | 87 | 74 |
| Example 27 | 68 | 59 |
| Example 28 | 40 | 45 |
| Example 29 | 29 | 65 |

The results of Examples 30-41 are shown in Table 12.

Example 30

0 wt % of any antioxidant was compounded with PMMA using an 18 mm twin screw extruder at 230° C. and 280-300 RPMs, resulting in a material with no additive but a similar molecular weight as it had seen the same processing steps. The extruded material was chopped into pellets and then directly molded into 10.16×10.16×0.318 cm plaques using a Toyo 110 ton injection molding machine at 232° C. OSD testing was performed with canola oil and Detergent 1.

Example 31

0.05 wt % BHT and 0.05 wt % AO 1076 were compounded with PMMA using an 18 mm twin screw extruder at 230° C. and 280-300 RPMs. HPLC analysis shows actual loading levels of 0.04 wt % BHT and 0.05 wt % AO 1076. The extruded material was chopped into pellets and then directly molded into 10.16×10.16×0.318 cm plaques using a Toyo 110 ton injection molding machine at 232° C. OSD testing was performed with canola oil and Detergent 1.

Example 32

0.25 wt % BHT and 0.25 wt % AO 1076 were compounded with PMMA using an 18 mm twin screw extruder at 230° C. and 280-300 RPMs. HPLC analysis shows actual loading levels of 0.20 wt % BHT and 0.21 wt % AO 1076. The extruded material was chopped into pellets and then directly molded into 10.16×10.16×0.318 cm plaques using a Toyo 110 ton injection molding machine at 232° C. OSD testing was performed with canola oil and Detergent 1.

Example 33

0.50 wt % BHT and 0.50 wt % AO 1076 were compounded with PMMA using an 18 mm twin screw extruder at 230° C. and 280-300 RPMs. HPLC analysis shows actual loading levels of 0.38 wt % BHT and 0.41 wt % AO 1076. The extruded material was chopped into pellets and then directly molded into 10.16×10.16×0.318 cm plaques using a Toyo 110 ton injection molding machine at 232° C. OSD testing was performed with canola oil and Detergent 1.

Example 34

0 wt % of any antioxidant was compounded with NAS 30 using an 18 mm twin screw extruder at 245° C. and 280-300 RPMs, resulting in a material with no additive but a similar molecular weight as it had seen the same processing steps. The extruded material was chopped into pellets and then directly molded into 10.16×10.16×0.318 cm plaques using a Toyo 110 ton injection molding machine at 227° C. OSD testing was performed with canola oil and Detergent 1.

Example 35

0.05 wt % BHT and 0.05 wt % AO 1076 were compounded with NAS 30 using an 18 mm twin screw extruder at 245° C. and 280-300 RPMs. HPLC analysis shows actual loading levels of 0.04 wt % BHT and 0.04 wt % AO 1076. The extruded material was chopped into pellets and then directly molded into 10.16×10.16×0.318 cm plaques using a Toyo 110 ton injection molding machine at 227° C. OSD testing was performed with canola oil and Detergent 1.

Example 36

0.25 wt % BHT and 0.25 wt % AO 1076 were compounded with NAS 30 using an 18 mm twin screw extruder at 245° C. and 280-300 RPMs. HPLC analysis shows actual loading levels of 0.18 wt % BHT and 0.20 wt % AO 1076. The extruded material was chopped into pellets and then directly molded into 10.16×10.16×0.318 cm plaques using a Toyo 110 ton injection molding machine at 227° C. OSD testing was performed with canola oil and Detergent 1.

Example 37

0.5 wt % BHT and 0.5 wt % AO 1076 were compounded with NAS 30 using an 18 mm twin screw extruder at 245° C.

and 280-300 RPMs. HPLC analysis shows actual loading levels of 0.37 wt % BHT and 0.42 wt % AO 1076. The extruded material was chopped into pellets and then directly molded into 10.16×10.16×0.318 cm plaques using a Toyo 110 ton injection molding machine at 227° C. OSD testing was performed with canola oil and Detergent 1.

Example 38

0 wt % of any antioxidant was compounded with Copolyester B using an 18 mm twin screw extruder at 265° C. and 280-300 RPMs, resulting in a material with no additive but a similar molecular weight as it had seen the same processing steps. The extruded material was chopped into pellets and then directly molded into 10.16×10.16×0.318 cm plaques using a Toyo 110 ton injection molding machine at 254° C. OSD testing was performed with canola oil and Detergent 1.

Example 39

0.05 wt % BHT and 0.05 wt % AO 1076 were compounded with Copolyester B using an 18 mm twin screw extruder at 265° C. and 280-300 RPMs. HPLC analysis shows actual loading levels of 0.05 wt % BHT and 0.04 wt % AO 1076. The extruded material was chopped into pellets and then directly molded into 10.16×10.16×0.318 cm plaques using a Toyo 110 ton injection molding machine at 254° C. OSD testing was performed with canola oil and Detergent 1.

Example 40

0.25 wt % BHT and 0.25 wt % AO 1076 were compounded with Copolyester B using an 18 mm twin screw extruder at 265° C. and 280-300 RPMs. HPLC analysis shows actual loading levels of 0.21 wt % BHT and 0.20 wt % AO 1076. The extruded material was chopped into pellets and then directly molded into 10.16×10.16×0.318 cm plaques using a Toyo 110 ton injection molding machine at 254° C. OSD testing was performed with canola oil and Detergent 1.

Example 41

0.5 wt % BHT and 0.5 wt % AO 1076 were compounded with Copolyester B using an 18 mm twin screw extruder at 265° C. and 280-300 RPMs. HPLC analysis shows actual loading levels of 0.39 wt % BHT and 0.44 wt % AO 1076. The extruded material was chopped into pellets and then directly molded into 10.16×10.16×0.318 cm plaques using a Toyo 110 ton injection molding machine at 254° C. OSD testing was performed with canola oil and Detergent 1.

The percent transmission of Examples 30-41 is provided in Table 12.

TABLE 12

Percent transmission for Examples 30-41 after OSD testing.

|  | Percent Transmission after 24 h in canola oil and 24 h in Detergent 1 |
|---|---|
| Example 30 | 5 |
| Example 31 | 23 |
| Example 32 | 48 |
| Example 33 | 28 |
| Example 34 | 2 |
| Example 35 | 77 |
| Example 36 | 68 |
| Example 37 | 62 |
| Example 38 | 12 |
| Example 39 | 40 |
| Example 40 | 2 |
| Example 41 | 31 |

A summary of all of the Examples, 1-41, is presented in Table 13 for ease of reference

TABLE 13

Summary of Examples

|  | Example # | Antioxidants | Weight % of Antioxidant Added | Loading Level (wt %) | Oil | Detergent | % Transmission |
|---|---|---|---|---|---|---|---|
| Copolyester A | 1 | BHT | 0.10 | 0.06 | Canola | 1 | 12 |
| Copolyester A | 2 | BHT | 0.50 | 0.43 | Canola | 1 | 15 |
| Copolyester A | 3 | BHT | 1 | 0.90 | Canola | 1 | 35 |
| Copolyester A | 4 | AO1076 | 0.10 | 0.07 | Canola | 1 | 59 |
| Copolyester A | 5 | AO1076 | 0.5 | 0.35 | Canola | 1 | 33 |
| Copolyester A | 6 | AO1076 | 1 | 0.78 | Canola | 1 | 45 |
| Copolyester A | 7 | None | 0 | 0 | Canola | 1 | 7 |
| Copolyester A | 8 | AO1076 | 0.05 | 0.04 | Canola | 1 | 51 |
|  |  | BHT | 0.05 | 0.02 |  |  |  |
| Copolyester A | 9 | AO1076 | 0.25 | 0.21 | Canola | 1 | 90 |
|  |  | BHT | 0.25 | 0.15 |  |  |  |
| Copolyester A | 10 | AO1076 | 0.50 | 0.55 | Canola | 1 | 34 |
|  |  | BHT | 0.50 | 0.55 |  |  |  |
| Copolyester A | 11 | AO1076 | 0.25 | 0.19 | Canola | 1 | 79 |
|  |  | BHA | 0.25 | 0.22 |  |  |  |
| Copolyester A | 12 | BHT | 0.25 | 0.16 | Canola | 1 | 82 |
|  |  | Vitamin E | 0.25 | 0.17 |  |  |  |
| Copolyester A | 13 | BHA | 0.25 | 0.17 | Canola | 1 | 75 |
|  |  | Vitamin E | 0.25 | 0.20 |  |  |  |
| Copolyester A | 14 | AO1076 | 0.25 | 0.20 | Canola | 1 | 69 |
|  |  | TBHQ | 0.25 | 0.17 |  |  |  |
| Copolyester A | 15 | TBHQ | 0.25 | 0.18 | Canola | 1 | 48 |
|  |  | Vitamin E | 0.25 | 0.22 |  |  |  |

TABLE 13-continued

Summary of Examples

| | Example # | Antioxidants | Weight % of Antioxidant Added | Loading Level (wt %) | Oil | Detergent | % Transmission |
|---|---|---|---|---|---|---|---|
| Copolyester A | 16 | None | 0 | 0 | Canola | 1 | 7 |
| Copolyester A | 17 | AO1076 | 0.25 | 0.19 | Canola | 1 | 44 |
| | | AO Phosphite | 0.25 | 0.19 | | | |
| Copolyester A | 18 | A1076 | 0.25 | 0.19 | Canola | 1 | 57 |
| | | AO800 | 0.25 | 0.19 | | | |
| Copolyester A | 19 | AO1076 and AO802 | 0.25 | 0.19 | Canola | 1 | 14 |
| | | | 0.25 | 0.23 | | | |
| Copolyester A | 20 | AO Phosphite | 0.25 | 0.15 | Canola | 1 | 46 |
| | | Vitamin E | 0.25 | 0.19 | | | |
| Copolyester A | 21 | AO800 | 0.25 | 0.17 | Canola | 1 | 58 |
| | | Vitamin E | 0.25 | 0.18 | | | |
| Copolyester A | 22 | AO802 | 0.25 | 0.24 | Canola | 1 | 3 |
| | | Vitamin E | 0.25 | 0.17 | | | |
| Copolyester A | 23 | None | 0 | 0 | Canola | 1 | 7 |
| Copolyester A | 24 | BHT | 0.10 | 0.10 | Olive | 1 | 86 |
| | | AO1076 | 0.10 | 0.09 | Canola | 1 | 42 |
| | | | | | Soybean | 1 | 28 |
| | | | | | Olive | 2 | 43 |
| | | | | | Canola | 3 | 67 |
| | | | | | Corn | 3 | 59 |
| Copolyester A | 25 | BHT | 0.15 | 0.19 | Olive | 1 | 93 |
| | | AO1076 | 0.15 | 0.18 | Canola | 1 | 71 |
| | | | | | Soybean | 1 | 44 |
| | | | | | Olive | 2 | 68 |
| | | | | | Canola | 3 | 81 |
| | | | | | Corn | 3 | 70 |
| Copolyester A | 26 | BHT | 0.20 | 0.23 | Olive | 1 | 91 |
| | | AO1076 | 0.20 | 0.24 | Canola | 1 | 58 |
| | | | | | Soybean | 1 | 65 |
| | | | | | Olive | 2 | 66 |
| | | | | | Canola | 3 | 87 |
| | | | | | Corn | 3 | 74 |
| Copolyester A | 27 | BHT | 0.25 | 0.31 | Olive | 1 | 62 |
| | | AO1076 | 0.25 | 0.30 | Canola | 1 | 35 |
| | | | | | Soybean | 1 | 36 |
| | | | | | Olive | 2 | 63 |
| | | | | | Canola | 3 | 68 |
| | | | | | Corn | 3 | 59 |
| Copolyester A | 28 | BHT | 0.40 | 0.55 | Olive | 1 | 74 |
| | | AO1076 | 0.40 | 0.56 | Canola | 1 | 33 |
| | | | | | Soybean | 1 | 13 |
| | | | | | Olive | 2 | 59 |
| | | | | | Canola | 3 | 40 |
| | | | | | Corn | 3 | 45 |
| Copolyester A | 29 | None | 0 | 0 | Olive | 1 | 58 |
| | | | | | Canola | 1 | 34 |
| | | | | | Soybean | 1 | 32 |
| | | | | | Olive | 2 | 13 |
| | | | | | Canola | 3 | 29 |
| | | | | | Corn | 3 | 65 |
| PMMA | 30 | None | 0 | 0 | Canola | 1 | 5 |
| PMMA | 31 | BHT | 0.05 | 0.04 | Canola | 1 | 23 |
| | | AO1076 | 0.05 | 0.05 | | | |
| PMMA | 32 | BHT | 0.25 | 0.20 | Canola | 1 | 48 |
| | | AO1076 | 0.25 | 0.21 | | | |
| PMMA | 33 | BHT | 0.50 | 0.38 | Canola | 1 | 28 |
| | | AO1076 | 0.50 | 0.41 | | | |
| NAS | 34 | None | 0 | 0 | Canola | 1 | 2 |
| NAS | 35 | BHT | 0.05 | 0.04 | Canola | 1 | 77 |
| | | AO1076 | 0.05 | 0.04 | | | |
| NAS | 36 | BHT | 0.25 | 0.18 | Canola | 1 | 68 |
| | | AO1076 | 0.25 | 0.20 | | | |
| NAS | 37 | BHT | 0.50 | 0.37 | Canola | 1 | 62 |
| | | AO1076 | 0.50 | 0.42 | | | |
| Copolyester B | 38 | None | 0 | 0 | Canola | 1 | 12 |
| Copolyester B | 39 | BHT | 0.05 | 0.05 | Canola | 1 | 40 |
| | | AO1076 | 0.05 | 0.04 | | | |
| Copolyester B | 40 | BHT | 0.25 | 0.21 | Canola | 1 | 2 |
| | | AO1076 | 0.25 | 0.22 | | | |
| Copolyester B | 41 | BHT | 0.50 | 0.39 | Canola | 1 | 31 |
| | | AO1076 | 0.50 | 0.44 | | | |

It can be clearly seen from a comparison of the data in the above relevant working examples that a combination of the phenolic antioxidants useful in the invention within a certain loading level can reduce oxidative degradation at the surface of certain polymers.

The invention has been described in detail with reference to the embodiments disclosed herein, but it will be understood that variations and modifications can be effected within the scope of this invention.

I claim:

1. A polymer composition comprising:
   (A) a copolyester comprising residues of terephthalic acid, 1,4-cyclohexanedimethanol, and 2,2,4,4-tetramethyl-cyclobutanediol, and
   (B) a stabilizing composition comprising:
      (1) a phenolic antioxidant without a long-chain substituent; and
      (2) a phenolic antioxidant with a long-chain substituent,
   wherein phenolic antioxidant (1) is butylated hydroxytoluene (BHT) or butylated hydroxyanisole (BHA),
   wherein phenolic antioxidant (2) is octadecyl-3-(3,5-di-tert-butyl-4-hydroxyphenyl)-propionate or Vitamin E, and
   wherein the total amount of phenolic antioxidants is from 0.30 to 0.50 weight percent, based on the total weight percentage of the polymer composition, and as measured by HPLC analysis of the final polymer composition, and
   wherein the weight ratio of phenolic antioxidant (1) to phenolic antioxidant (2) is from 0.7:1 to 1.3:1.

2. The polymer composition according to claim 1, wherein at least one of the phenolic antioxidants is sterically hindered.

3. The polymer composition according to claim 1, wherein both phenolic antioxidants are sterically hindered.

4. The polymer composition according to claim 1, wherein the weight ratio of phenolic antioxidant (1) to phenolic antioxidant (2) is from 0.8:1 to 1.2:1.

5. The polymer composition according to claim 1, wherein the weight ratio of phenolic antioxidant (1) to phenolic antioxidant (2) is from 0.9:1 to 1.1:1.

6. The polymer composition according to claim 1, wherein the weight ratio of phenolic antioxidant (1) to phenolic antioxidant (2) is from 0.95:1 to 1.05:1.

7. The polymer composition according to claim 1, wherein the phenolic antioxidant (1) is butylated hydroxyanisole (BHA).

8. The polymer composition according to claim 1, wherein the phenolic antioxidant (1) is butylated hydroxytoluene (BHT).

9. The polymer composition according to claim 1, wherein the phenolic antioxidant (2) is octadecyl-3-(3,5-di-tert-butyl-4-hydroxyphenyl)-propionate.

10. The polymer composition according to claim 1, wherein the phenolic antioxidant (2) is Vitamin E.

11. The polymer composition according to claim 1, wherein the phenolic antioxidant (1) is butylated hydroxytoluene (BHT) and the phenolic antioxidant (2) is octadecyl-3-(3,5-di-tert-butyl-4-hydroxyphenyl)-propionate.

12. The polymer composition according to claim 1, optionally further comprising a mold release agent.

13. The polymer composition according to claim 12, wherein the copolyester comprises 15 to 40 mole % 2,2,4,4-tetramethyl-1,3-cyclobutanediol residues and 60 to 85 mole % 1,4-cyclohexanedimethanol residues and 70 to 100 mole % terephthalic acid residues, based on a total of 100 mole % acid residues and a total of 100 mole % diol residues.

14. The polymer composition according to claim 12, wherein the copolyester comprises 20 to 40 mole % 2,2,4,4-tetramethyl-1,3-cyclobutanediol residues and 60 to 80 mole % 1,4-cyclohexanedimethanol residues and 70 to 100 mole % terephthalic acid residues, based on a total of 100 mole % acid residues and a total of 100 mole % diol residues.

15. The polymer composition according to claim 14, wherein the copolyester comprises 20 to 30 mole % 2,2,4,4-tetramethyl-1,3-cyclobutanediol residues and 70 to 80 mole % 1,4-cyclohexanedimethanol residues and 70 to 100 mole % terephthalic acid residues, based on a total of 100 mole % acid residues and a total of 100 mole % diol residues.

16. The polymer composition according to claim 14, wherein the copolyester comprises 30 to 40 mole % 2,2,4,4-tetramethyl-1,3-cyclobutanediol residues and 60 to 70 mole % 1,4-cyclohexanedimethanol residues and 70 to 100 mole % terephthalic acid residues, based on a total of 100 mole % acid residues and a total of 100 mole % diol residues.

17. The polymer composition according to claim 12, where the mold release agent is selected from the group consisting of erucylamide, stearamide, calcium stearate, stearic acid, montanic acid, montanic acid esters, montanic acid salts, oleic acid, palmitic acid, paraffin wax, polyethylene waxes, polypropylene waxes, carnauba wax, glycerol monostearate, and glycerol distearate.

18. The polymer composition according to claim 12, where the mold release agent is not zinc stearate.

19. The polymer composition according to claim 12, wherein the mold release agent is selected from stearic acid and palmitic acid.

20. The polymer composition according to claim 12, which comprises from 0.01 to 5 weight percent of the mold release agent.

21. The polymer composition according to claim 12, which comprises from 0.35 to 0.50 weight percent of the stabilizing composition.

22. A method for stabilizing a thermoplastic polymer against surface oxidative degradation, comprising: incorporating into the polymer an effective stabilizing amount of a stabilizing composition,
   wherein the polymer comprises a copolyester which comprises residues of terephthalic acid, 1,4-cyclohexanedimethanol, and 2,2,4,4-tetramethyl-cyclobutanediol, and
   wherein the stabilizing composition comprises:
      (1) a phenolic antioxidant having 10 to 20 carbon atoms; and
      (2) a phenolic antioxidant having greater than 20 carbon atoms,
   wherein phenolic antioxidant (1) is butylated hydroxytoluene (BHT) or butylated hydroxyanisole (BHA),
   wherein phenolic antioxidant (2) is octadecyl-3-(3,5-di-tert-butyl-4-hydroxyphenyl)-propionate or Vitamin E,
   wherein the weight ratio of phenolic antioxidant (1) to phenolic antioxidant (2) is from 0.7:1 to 1.3:1, and
   wherein the effective stabilizing amount is from 0.30 to 0.50 weight percent, based on the total weight percentage of the polymer composition, and as measured by HPLC analysis of the final polymer composition.

23. The method according to claim 22, wherein the incorporating step comprises forming a master batch by compounding the phenolic antioxidants with a polymer using an extruder, wherein phenolic antioxidant (1) and phenolic antioxidant (2) are fed into the extruder separately at different locations.

* * * * *